(12) United States Patent
Yoshizaki et al.

(10) Patent No.: US 7,640,728 B2
(45) Date of Patent: Jan. 5, 2010

(54) EXHAUST GAS PURIFICATION APPARATUS AND EXHAUST GAS PURIFICATION METHOD FOR INTERNAL COMBUSTION ENGINE

(75) Inventors: Kouji Yoshizaki, Numazu (JP); Makoto Ogiso, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 268 days.

(21) Appl. No.: 11/666,292

(22) PCT Filed: Nov. 2, 2005

(86) PCT No.: PCT/JP2005/020489
§ 371 (c)(1),
(2), (4) Date: Apr. 26, 2007

(87) PCT Pub. No.: WO2006/049309
PCT Pub. Date: May 11, 2006

(65) Prior Publication Data
US 2007/0294999 A1    Dec. 27, 2007

(30) Foreign Application Priority Data
Nov. 2, 2004  (JP) .............................. 2004-319195
Jun. 10, 2005 (JP) .............................. 2005-171498

(51) Int. Cl.
*F01N 3/00* (2006.01)
(52) U.S. Cl. .............................. 60/286; 60/287; 60/288; 60/292; 60/295; 60/303
(58) Field of Classification Search ................... 60/274, 60/286, 287, 288, 291, 292, 295, 297, 303
See application file for complete search history.

(56) References Cited

U.S. PATENT DOCUMENTS
4,685,291 A * 8/1987 Ha .............................. 60/286
(Continued)

FOREIGN PATENT DOCUMENTS
EP   1 180 583 A2   2/2002
EP   1 180 586 A2   2/2002
JP   U 63-78118     5/1988
(Continued)

*Primary Examiner*—Binh Q. Tran
(74) *Attorney, Agent, or Firm*—Oliff & Berridge, PLC

(57) ABSTRACT

In an exhaust gas purification apparatus for an internal combustion engine (1) equipped with independent exhaust passages (2a, 2b) provided one for each cylinder group (1a, 1b) with a catalyst (3a, 3b) having a NOx trapping ability being arranged in each exhaust passage, the present invention is intended to provide a technique that can independently control the flow rates of exhaust gases flowing into the respective catalysts. To this end, the exhaust gas purification apparatus according to the present invention provides a communication passage (4) connecting mutually portions of said exhaust passages (2a, 2b) at upstream of said catalysts (3a, 3b), an upstream side switching valve (5) openning and closing said upstream side communication passage (4), a plurality of flow rate regulation valves (6a, 6b) being arranged at downstream of connecting portions of said exhaust passages with said upstream side communication passage, respectively, and a control section (9) controlling said upstream side switching valve (5) and said respective flow rate regulation valves (6a, 6b) in accordance with the states of said respective catalysts (3a, 3b). When the NOx trapping ability of one of the plurality of catalysts (3a, 3b) is regenerated, the control section (9) opens the upstream side switching valve (5), fully closes one flow rate regulation valve (6a, 6b) in one of the exhaust passages (2a, 2b) in which the one catalyst (3a, 3b) is arranged, and operates a reducing agent addition valve (7a, 7b) in such a manner that the reducing agent arrives at the one catalyst (3a, 3b) when the actual degree of opening of the one flow rate regulation valve (6a, 6b) becomes fully closed.

9 Claims, 13 Drawing Sheets

U.S. PATENT DOCUMENTS

| | | | | |
|---|---|---|---|---|
| 5,657,625 | A | * | 8/1997 | Koga et al. ............... 60/274 |
| 5,956,949 | A | | 9/1999 | Mayer et al. |
| 5,974,793 | A | * | 11/1999 | Kinugasa et al. ............ 60/285 |
| 6,047,542 | A | * | 4/2000 | Kinugasa et al. ............ 60/274 |
| 6,082,100 | A | * | 7/2000 | Boegner et al. ............. 60/278 |
| 6,779,339 | B1 | * | 8/2004 | Laroo et al. ............... 60/297 |
| 7,055,311 | B2 | * | 6/2006 | Beutel et al. .............. 60/285 |
| 7,448,205 | B2 | * | 11/2008 | Takahashi et al. ........... 60/285 |
| 2002/0100273 | A1 | | 8/2002 | Bubeck et al. |

FOREIGN PATENT DOCUMENTS

| | | |
|---|---|---|
| JP | A 6-173666 | 6/1994 |
| JP | A 8-121153 | 5/1996 |
| JP | B2 2727906 | 3/1998 |
| JP | A-2001-140631 | 5/2001 |
| JP | A 2002-129951 | 5/2002 |
| JP | A 2003-90211 | 3/2003 |
| JP | A 2003-214154 | 7/2003 |
| JP | A 2003-343244 | 12/2003 |

* cited by examiner

EXHAUST GAS PURIFICATION APPARATUS AND EXHAUST GAS PURIFICATION METHOD FOR INTERNAL COMBUSTION ENGINE

TECHNICAL FIELD

The present invention relates to an exhaust purification apparatus for an internal combustion engine in which a plurality of NOx traps are arranged in parallel with one another in an exhaust system of the internal combustion engine.

BACKGROUND ART

As an exhaust gas purification apparatus for an internal combustion engine, Japanese patent No. 2727906 discloses technique in which an exhaust passage of the internal combustion engine is bifurcated into two branch passages at its intermediate portion, and a NOx trap is arranged in each branch passage, so that the amounts or flow rates of exhaust gas flowing into these NOx traps can be alternately decreased to regenerate the NOx trapping abilities of the NOx traps.

In the specification of U.S. Pat. No. 5,956,949, there is disclosed a technique that includes two exhaust passages connected with the respective banks of cylinders of a V-type internal combustion engine, and a catalyst arranged in each of the exhaust passages, wherein one of the catalysts can be activated at an early time by increasing the amount of the exhaust gas flowing into the one catalyst at the startup of the internal combustion engine.

In Japanese patent application laid-open No. H8-121153, there has also been disclosed a technique that includes two exhaust passages connected with the respective banks of cylinders of a V-type internal combustion engine, and a catalyst arranged in one of the exhaust passages, wherein the catalysts can be activated in early time by making the exhaust gases discharged from both of the banks of cylinders flow into the catalysts at the startup of the internal combustion engine.

In Japanese patent application laid-open No. 2003-343244, there has further been disclosed a technique that includes two exhaust passages connected with the respective banks of cylinders of a V-type internal combustion engine, and a catalyst arranged in each of the exhaust passages, wherein the exhaust gases discharged from both of the banks of cylinders are caused to flow into the two catalysts in a serial manner at the startup of the internal combustion engine, whereby an upstream side one of the catalysts is activated at an early time.

In Japanese patent application laid-open No. H6-173666, there is disclosed a technique in which an exhaust passage of an internal combustion engine is bifurcated into two branch passages at its intermediate portion, and a catalyst is arranged in each branch passage, so that an exhaust gas is made to flow through the two catalysts in a serial manner or in a parallel manner.

In Japanese patent application laid-open No. 2002-129951, there is disclosed a construction that includes two exhaust passages connected with the respective banks of cylinders of a V-type internal combustion engine with a three-way catalyst and an NOx storage and reduction type storage reduction catalyst being arranged in each exhaust passage.

In Japanese utility model laid-open No. S63-78118, there is also disclosed a construction that includes two exhaust passages connected with the respective banks of cylinders of a V-type internal combustion engine, a catalyst arranged in each exhaust passage, and a communication passage connecting the two exhaust passages with each other at a location upstream of the respective catalysts.

DISCLOSURE OF THE INVENTION

In case where an independent exhaust passage is provided for each cylinder group with a catalyst having a NOx trapping ability and a PM trapping ability being arranged in each exhaust passage, as in a V-type internal combustion engine, it is difficult to regulate the flow rates of the exhaust gases flowing into the respective catalysts independently from each other. Therefore, regeneration processing, sulfur poisoning recovery processing, etc., of the catalysts might not be able to be performed in a suitable manner.

Accordingly, the object of the present invention is that in an exhaust gas purification apparatus for an internal combustion engine in which an independent exhaust passage is provided for each cylinder group with a catalyst having a NOx trapping ability and a PM trapping ability being arranged in each exhaust passage, so that the flow rates of exhaust gases flowing into the respective catalysts can be controlled independently from each other, thereby making it possible to perform the regeneration processing, the sulfur poisoning recovery processing, etc., of the catalysts in a suitable manner.

In order to achieve the above-mentioned object, the present invention adopts the following means.

That is, an exhaust gas purification apparatus for an internal combustion engine equipped with a plurality of independent exhaust passages provided one for each cylinder group, and a plurality of catalysts each having a NOx trapping ability and a PM trapping ability and being arranged one for each exhaust passage, according to the present invention comprising: an upstream side communication passage connecting mutually portions of said exhaust passages at upstream of said catalysts; an upstream side switching valve openning and closing said upstream side communication passage; a plurality of flow rate regulation valves being arranged at downstream of connecting portions of said exhaust passages with said upstream side communication passage, respectively; and a control section controlling said upstream side switching valve and said respective flow rate regulation valves in accordance with the states of said respective catalysts.

In the exhaust gas purification apparatus for an internal combustion engine as constructed in this manner, the control section controls the upstream side switching valve and the respective flow rate regulation valves in an appropriate manner, whereby it becomes possible to change the flow rates of exhaust gases flowing into the respective catalysts without influencing the operating condition of the internal combustion engine.

For example, when the flow rate of exhaust gas flowing into one of the plurality of catalysts is to be decreased, the upstream side switching valve is opened and at the same time the degree of opening of a flow rate regulation valve in an exhaust passage in which the one catalyst is arranged (hereinafter referred to as one exhaust passage) is caused to decrease more than those of the other flow rate regulation valves.

In this case, a part of the exhaust gas discharged from the internal combustion engine to the one exhaust passage comes to flow into the other exhaust passages through the upstream side communication passage. As a result, the flow rate of the exhaust gas flowing into the one catalyst is decreased. Accordingly, it becomes possible to decrease the flow rate of the exhaust gas flowing into the one catalyst without changing the flow rate of the exhaust gas discharged from the internal combustion engine (i.e., a cylinder group with which the one exhaust passage is connected). In addition, with respect to the other catalysts, the flow rates of exhaust gases flowing into these catalysts, respectively, can be decreased in the same manner without influencing the operating condition of the internal combustion engine.

In case where each of the catalysts according to the present invention has a NOx trapping ability, when the NOx trapped (or absorbed or occluded) in each catalyst is made to be released from the catalyst, or when each catalyst is recovered from sulfur poisoning (hereinafter referred to simply as the time when the NOx trapping ability of each catalyst is regenerated), it is necessary to control the air-fuel ratio of an exhaust gas flowing into each catalyst to be a stoichiometric air-fuel ratio or a rich air-fuel ratio.

As a method for controlling the air-fuel ratio of an exhaust gas flowing into each catalyst to be a stoichiometric air-fuel ratio or a rich air-fuel ratio, there can be presented, as an example, a method for adding a reducing agent such as fuel, etc., to the exhaust gas at upstream of each catalyst. Here, note that when a reducing agent is added to the exhaust gas at upstream of a connecting portion of each exhaust passage with the upstream side communication passage, a part of the reducing agent flows into the other exhaust passages through the upstream side communication passage together with the exhaust gas. Therefore, it is preferable to add the reducing agent to the exhaust gas at downstream of the connecting portion of the upstream side communication passage and upstream of the respective catalysts in the respective exhaust passages.

Accordingly, in the exhaust gas purification apparatus for an internal combustion engine according to the present invention, a reducing agent addition valve may be arranged in each exhaust passage between its connectting portion with the upstream side communication passage and each catalyst. And, where the air-fuel ratio of the exhaust gas flowing into one catalyst is set to be a stoichiometric air-fuel ratio or a rich air-fuel ratio, the reducing agent may be added to the exhaust gas from one reducing agent addition valve that is arranged in one exhaust passage in which the one catalyst is arranged.

In case where the air-fuel ratio of the exhaust gas flowing into the one catalyst is to be decreased to the stoichiometric air-fuel ratio or below according to the above-mentioned method, the flow rate of exhaust gas flowing into the one catalyst may be decreased without influencing the operating condition of the internal combustion engine by opening the upstream side switching valve and at the same time decreasing the degree of opening of one flow rate regulation valve which is arranged in the one exhaust passage to a value less than those of other flow rate regulation valves.

When the flow rate of the exhaust gas flowing into the one catalyst is decreased, the amount of reducing agent required to be added from the one reducing agent addition valve so as to decrease the air-fuel ratio of the exhaust gas up to the stoichiometric air-fuel ratio or the rich air-fuel ratio can be decreased.

In addition, as the flow rate of the exhaust gas flowing into the one catalyst decreases, the flow speed of the exhaust gas flowing into the one catalyst slows, too, so the space velocity (sv) of the reducing agent decreases. As the space velocity (sv) of the reducing agent decreases, the reactivity between the reducing agent and NOx (NOx purification rate) is improved, so the NOx can be purified by a smaller amount of reducing agent.

Accordingly, by regenerating the NOx trapping ability of each catalyst by making use of the present invention, it becomes possible to decrease the amount of reducing agent to be added without influencing the operating condition of the internal combustion engine.

Also, in case where the NOx trapping ability of the one catalyst is regenerated by using the present invention, the control section may fully close the one flow rate regulation valve in the one exhaust passage after or simultaneously with the opening of the upstream side switching valve, and operate the one reducing agent addition valve of the one exhaust passage at timing at which the reducing agent arrives at the one catalyst when the actual degree of opening of the one flow rate regulation valve becomes fully closed.

In this case, the flow of the exhaust gas flowing into the one catalyst will stop when the reducing agent arrives at the one catalyst. As a result, the reducing agent comes to stay in the one catalyst. When the reducing agent stays in the one catalyst, the interior of the one catalyst is kept in a fuel rich atmosphere even if the one reducing agent addition valve does not continue the addition of the reducing agent. As a result, it becomes possible to regenerate the NOx trapping ability of the one catalyst with a smaller amount of reducing agent.

As a method of stopping the flow of the exhaust gas flowing into the one catalyst when the reducing agent arrives at the one catalyst, in other words, a method of synchronizing the timing at which the actual degree of opening of the one flow rate regulation valve is fully closed with the timing at which the reducing agent arrives at the one catalyst, there can be exemplified a method of operating the one reducing agent addition valve in a response delay period of the flow rate regulation valve.

The flow rate regulation valve will cause a response delay from the time of receipt of a fully closing command signal from the control section until when the actual degree of opening thereof becomes a fully closed opening. Therefore, if the one reducing agent addition valve performs the addition of the reducing agent during the response delay period of the one flow rate regulation valve, it is possible to substantially synchronize the timing at which the reducing agent arrives at the one catalyst and the timing at which the actual degree of opening of the one flow rate regulation valve becomes fully closed with each other.

The timing at which the fuel added from the reducing agent addition valve arrives at the catalyst also changes depending on the flow speed (flow rate) of the exhaust gas. The flow speed (flow rate) of the exhaust gas is influenced by the number of revolutions per minute of the engine (the amount of intake air). Therefore, the timing at which the reducing agent is added from the reducing agent addition valve may be made earlier in accordance with the decreasing number of revolutions per minute of the engine (the decreasing amount of intake air) during the response delay period of the flow rate regulation valve.

In the present invention, as a catalyst having a NOx trapping ability, there can be exemplified a catalytic converter carrying an NOx storage and reduction type catalyst and an NOx storage and reduction type catalyst, a catalytic converter carrying a NOx trap (NOx absorption agent), a particulate filter carrying an NOx storage and reduction type catalyst, or a particulate filter carrying a NOx trap (NOx absorption agent), etc.

In cases where a catalyst according to the present invention has a PM trapping ability such as a particulate filter having only a PM trapping ability, a particulate filter carrying an NOx storage and reduction type catalyst, a particulate filter carrying a NOx trap (NOx absorption agent), a particulate filter carrying an oxidation catalyst, etc., the upstream side switching valve may be opened as required.

For example, when the amount of PM collection varies according to each particulate filter, a pressure loss (or pressure drop) differs according to each particulate filter, resulting in a variation in the magnitude of back pressure acting on the respective cylinder groups. With the back pressure being varied according to each cylinder group, there will be a possibility of causing trouble such as variation in the outputs or exhaust emissions of the respective cylinder groups. Accordingly, if the upstream side switching valve is caused to open at the time when the amount of PM collection varies according to each particulate filter, the exhaust pressures in the respective exhaust passages are equalized so the occurrence of trouble as referred to above can be inhibited.

In addition, when a catalyst according to the present invention has a PM trapping ability, the control section can control the upstream side switching valve and the flow rate regulation valves so as to equalize amont of PM collection of the respective catalyst. For example, the control section according to the present invention can control the upstream side switching valve and the respective flow rate regulation valves in such a manner that in a predetermined period from startup of the internal combustion engine, the entire exhaust gas can flow into a specific one among the plurality of catalysts, and the specific catalyst can be changed at each startup of the internal combustion engine.

The amount of PM emitted from the internal combustion engine has a tendency to increase during cold operation from the engine starting to the completion of warm-up operation (namely, during warm-up operation) rather than during warm operation after the completion of warm-up operation. This is considered because the combustion state of the internal combustion engine during cold operation becomes unstable in comparison with during warm operation. Since the combustion states of the respective cylinders in that case are liable to vary from cylinder to cylinder, there is a possibility that the amount of PM emission might vary according to each cylinder group. Accordingly, in the internal combustion engine with independent exhaust systems (including exhaust passages and catalysts) for respective cylinder groups, the amount of PM collection can greatly vary according to each catalyst.

In case where the amount of PM collection varies according to each catalyst, the PM trapping abilities of all the catalysts are made to be regenerated based on a catalyst with the most amount of PM collection (hereinafter referred to as a PM regeneration processing). That is, when the amount of PM collection of at least one of the plurality of catalysts exceeds a fixed amount, the PM regeneration processing will be carried out with respect to all the catalysts even if a margin remains in the PM trapping abilities of other catalysts.

As a result, unnecessary PM regeneration processing might be performed on the catalysts with margins remaining in their PM trapping abilities, thus giving rise to a possibility of progressing the deterioration of fuel consumption and of thermal degradation result from the PM regeneration processing.

In contrast to this, if the entire exhaust gas flows into a specific catalyst among the plurality of catalysts in the predetermined period of time from startup of the internal combustion engine, i.e., during cold operation in which the amount of PM emitted from the internal combustion engine becomes the greatest, a large amount of PM will be collected by only the specific catalyst. In addition, the period of execution of the PM regeneration processing becomes one for several trips, so if the above-mentioned specific catalyst is changed from one to another at each startup of the internal combustion engine, the amounts of PM collections of the plurality of catalysts during the execution of the PM regeneration processing can be made substantially uniform.

As a result, when the amount of PM collection of one catalyst reaches a fixed amount (i.e., when the PM regeneration processing is executed), the amount of PM collection of each of the other catalysts also will reach substantially the fixed amount.

The exhaust gas purification apparatus according to the present invention may further equip with a reducing agent addition valve that is arranged in the each exhaust passage between its connecting portion with the upstream side communication passage and the each catalyst. In this case, when the PM regeneration processing of a specific catalyst among the plurality of catalysts is performed, the control section may open the upstream side switching valve, decrease the degree of opening of a flow rate regulation valve arranged in the same exhaust passage as that in which the specific catalyst is arranged, and further supply a reducing agent to the specific catalyst from a reducing agent addition valve which is arranged in the same exhaust passage as that in which the specific catalyst is arranged. After the specific catalyst rises in temperature up to a desired target temperature range, the control section may increase the degree of opening of the flow rate regulation valve which is arranged in the same exhaust passage as that in which the specific catalyst is arranged, and at the same time decrease the degree of opening of each of the other flow rate regulation valves which are arranged in the same exhaust passages as those in which the other catalysts are arranged, and further supply a reducing agent to the other catalysts from the other reducing agent addition valves which are arranged in the same exhaust passages as those in which the other catalysts are arranged.

When the PM trapping ability of a catalyst is regenerated, it is necessary to expose the catalyst to a lean atmosphere of a high temperature of around 500 C (Celsius) or above. Since it is rare that the temperature of the exhaust gas emitted from the internal combustion engine becomes 500 degrees C. or above, when the PM trapping ability of the catalyst is regenerated, there is required the processing of forcedly raising the temperature of the catalyst up to a target temperature range of 500 degrees C. or above (temperature raising processing). A method of supplying a reducing agent such as fuel, etc., to the catalyst thereby to generate the oxidation reaction heat of the reducing agent in the catalyst is effective as a method of executing the temperature raising processing.

Here note that when the amount of the exhaust gas flowing into the catalyst during the execution of the temperature raising processing increases, the oxidation reaction heat of the reducing agent might be deprived by the exhaust gas, so the time required until the catalyst arrives at the target temperature range might become longer. When the time required until the catalyst arrives at the target temperature range becomes longer, there arises a trouble that the operation time of the temperature raising processing becomes longer and the amount of reducing agent required for the temperature raising processing increases.

Accordingly, in the exhaust gas purification apparatus for an internal combustion engine according to the present invention, when the temperature raising processing is executed with respect to a specific catalyst, the upstream side switching valve is made to be opened and the degree of opening of a flow rate regulation valve (hereinafter referred to as a specific flow rate regulation valve), which is arranged in the same exhaust passage (hereinafter referred to as a specific exhaust passage) as that in which the specific catalyst is arranged, is made smaller than that of the flow rate regulation valves arranged in the other exhaust passages. Accordingly, a part of the exhaust gas emitted from the internal combustion engine to the specific exhaust passage comes to flow into the other exhaust passages through the upstream side communication passage. As a result, the flow rate of the exhaust gas flowing into the specific catalyst is decreased.

When the amount of the exhaust gas flowing into the specific catalyst during the execution of the temperature raising processing decreases, the specific catalyst becomes able to rise in temperature up to the target temperature range in a short time with a small amount of reducing agent.

When the specific catalyst rises in temperature up to the target temperature range, the PM collected in the specific catalyst that is oxidized, and the PM oxidation rate in that case becomes higher in accordance with the increasing amount of oxygen flowing into the specific catalyst. In addition, if the amount of the exhaust gas flowing into the specific catalyst continues to be kept in a decreased state after the temperature of the specific catalyst has risen to the target temperature range, there will be a possibility that the temperature of the specific catalyst rises excessively with the oxidation reaction heat of the PM. Accordingly, it is preferable to increase the amount of the exhaust gas flowing into the specific catalyst after the temperature of the specific catalyst has risen to the target temperature range.

In contrast to this, in the exhaust gas purification apparatus according to the present invention, after the temperature of the specific catalyst has risen to the desired target temperature range, the degree of opening of the specific flow rate regulation valve is caused to increase, and degrees of opening of flow rate regulation valves arranged in other exhaust passages are caused to decrease. Thus, the amount of the exhaust gas flowing into each of catalysts arranged in other exhaust passages decreases, and the amount of the exhaust gas flowing into the specific catalyst increases. As a result, it becomes possible to enhance the oxidation rate of the PM collected in the specific catalyst while inhibiting an excessive rise in the temperature of the specific catalyst.

According to the exhaust gas purification apparatus according to the present invention, the amounts of PM collections of the plurality of catalysts become substantially uniform, as mentioned above, it is preferable to regenerate the PM trapping abilities of the other catalysts substantially simultaneously with the regeneration of the specific catalyst.

In contrast to this, in the exhaust gas purification apparatus according to the present invention, when amounts of the exhaust gas flowing into other catalysts after the temperature of the specific catalyst has risen to the desired target temperature range are caused to decrease, reducing agent addition valves, which are arranged in same exhaust passages as those in which other catalysts are arranged, operate to supply a reducing agent to other catalysts, respectively. As a result, it becomes possible to raise temperatures of other catalysts up to the target temperature range in a short period of time with a small amount of reducing agent.

In addition, in the period in which the temperature raising processing of the specific catalyst is executed (in other words, the period in which the amount of the exhaust gas flowing into the specific catalyst is caused to decrease and amounts of exhaust gases flowing into other catalysts are caused to increase), temperatures of other catalysts are raised to some degree by a large amount of the exhaust gas. As a result, the amount of the reducing agent and the time required for raising temperatures of other catalysts up to the target temperature range can be further decreased.

According to the exhaust gas purification apparatus according to the present invention, the PM regeneration processing of the plurality of catalysts can be efficiently carried out in this manner, so it is possible to decrease the amount of the reducing agent and the time required for the PM regeneration processing of the plurality of catalysts.

In case where the catalysts used in the present invention have NOx trapping abilities, the processing of recovering the NOx trapping abilities of the catalysts from sulfur poisoning (sulfur poisoning recovery processing) is needed. Since the sulfur poisoning of the catalysts can be eliminated when the catalysts are exposed to a fuel rich atmosphere of a high temperature of around 500 degrees C. or above. The temperature raising processing similar to the above-mentioned PM regeneration processing is needed, when the catalysts are recovered from sulfur poisoning.

Accordingly, in the exhaust gas purification apparatus according to the present invention, when the temperature raising processing is performed to eliminate the sulfur poisoning of the specific catalyst, similar to the above-mentioned PM regeneration processing, the control section may control to open the upstream side switching valve, decrease the degree of opening of the specific flow rate regulation valve, and further supply a reducing agent to the specific catalyst from a reducing agent addition valve (hereinafter referred to as a specific reducing agent addition valve) which is arranged in the same exhaust passage as that in which the specific catalyst is arranged.

In this case, the amount of the exhaust gas flowing into the specific catalyst during the execution of the temperature raising processing decreases, so the specific catalyst can be raised in temperature up to the target temperature range in a short time with a small amount of reducing agent.

Here, note that in the PM regeneration processing, the amount of the exhaust gas flowing into the specific catalyst is caused to increase after the temperature of the specific catalyst has risen to the target temperature range, but in the SOx poisoning recovery processing, the amount of the exhaust gas flowing into the specific catalyst continues to be kept in a decreased state after the temperature of the specific catalyst has risen to the target temperature range. If the amount of the exhaust gas flowing into the specific catalyst is kept decreased after the specific catalyst has reached the target temperature range, it is possible to decrease the amount of reducing agent required to put the exhaust gas flowing into the specific catalyst into a fuel rich atmosphere.

Moreover, after the sulfur poisoning of the specific catalyst is made to be eliminated, the control section controls to increase the degree of opening of the specific flow rate regulation valve, and to decrease degrees of opening of flow rate regulation valves in other exhaust passages, and to further supply the reducing agent from reducing agent addition valves of other exhaust passages to other catalysts, respectively. In this case, it becomes possible to raise temperatures of other catalysts up to the target temperature range in a short period of time with a small amount of reducing agent, and to put exhaust gases flowing into other catalysts into a rich atmosphere with a small amount of reducing agent after temperatures of other catalysts have risen to the target temperature range.

In addition, in the period in which the sulfur recovery processing of the specific catalyst is executed (in other words, the period in which the amount of the exhaust gas flowing into the specific catalyst is caused to decrease and amounts of exhaust gases flowing into other catalysts are caused to increase), temperatures of other catalysts are raised to some degree by a large amount of the exhaust gas. As a result, the amount of the reducing agent and the time required for raising the temperatures of other catalysts up to the target temperature range can be further decreased.

The exhaust gas purification apparatus according to the present invention may further equipped with auxiliary exhaust passages that connect portions of exhaust passages at downstream of catalysts with other exhaust passages between corresponding catalysts and those connecting portions with the upstream side communication passage, respectively, auxiliary switching valves that open and close the auxiliary exhaust passages respectively, and cutoff valves that are arranged in exhaust passages between those first connecting portions with corresponding auxiliary exhaust passages at upstream of corresponding catalysts and those second connecting portions with the upstream side communication passage, wherein each of said flow rate regulation valves is arranged downstream of a third connecting portion of each of said exhaust passages with each of said auxiliary exhaust passages at the downstream of each of said catalysts.

In the exhaust gas purification apparatus as constructed in this manner, for example, the control section may control the upstream side switching valve, flow rate regulation valves, cutoff valves, and auxiliary switching valves in such a manner that in a predetermined period from startup of the internal combustion engine, the entire exhaust gas flows in series through the plurality of catalysts, and the order of the catalysts through which the exhaust gas flows (in particular, the catalyst into which the exhaust gas first flows) is changed at each startup of the internal combustion engine.

In case where the entire exhaust gas is made to flow in series through the plurality of catalysts, the control section controls to open the upstream side switching valve, to close the cutoff valve arranged in the same exhaust passage as that in which the specific catalyst is arranged, to open the flow rate regulation valve arranged in the same exhaust passage as that in which the specific catalyst is arranged, to close the auxiliary switching valve in the auxiliary exhaust passage connected with the specific exhaust passage downstream of the specific catalyst (the auxiliary exhaust passage that connects the specific exhaust passage at downstream of the specific catalyst and the other exhaust passage at upstream of the other catalyst with each other), to open the cutoff valve arranged in the same exhaust passage as that in which the other catalyst is arranged, to close the flow rate regulation valve arranged in the same exhaust passage as that in which the other catalyst is arranged, and to further open the auxiliary switching valve in the auxiliary exhaust passage connected with the other exhaust passage at downstream of the other catalyst (the auxiliary exhaust passage that connects the other exhaust passage at downstream of the other catalyst and the specific exhaust passage at upstream of the specific catalyst).

In this case, the entire exhaust gas emitted from the internal combustion engine to the specific exhaust passage flows into an other exhaust passage through the upstream side communication passage. The exhaust gas flowing from the specific exhaust passage into the other exhaust passage flows into an other catalyst together with the exhaust gas emitted from the internal combustion engine to the other exhaust passage. The entire exhaust gas passing through the other catalyst is directed from the other exhaust passage at downstream of the other catalyst to the specific exhaust passage at upstream of the specific catalyst through an auxiliary exhaust passage. The exhaust gas flowing into the specific exhaust passage at upstream of the specific catalyst passes through the specific catalyst.

Accordingly, the entire exhaust gas emitted from the internal combustion engine comes to flow through the specific catalyst after passing through the other catalyst. When the flow of the exhaust gas as stated above is achieved in a predetermined period from startup of the internal combustion engine (during the cold operation of the internal combustion engine), the entire exhaust gas emitted from the internal combustion engine flows into the specific catalyst after passing through the other catalyst. Thus, substantially all of PM emitted from the internal combustion engine come to be collected by the other catalyst. Then, if at the next startup of the internal combustion engine, the upstream side switching valve, the flow rate regulation valves, the cutoff valves and the auxiliary switching valves are controlled in such a manner that the entire exhaust gas emitted from the internal combustion engine passes through the other catalyst after passing through the specific catalyst, it becomes possible to make the amounts of PM collections of the plurality of catalysts substantially uniform.

In addition, when the exhaust gas of the internal combustion engine flows in series through the plurality of catalysts during the cold operation of the internal combustion engine, all catalysts can be warmed by a great amount of the exhaust gas, so it becomes possible to make uniform the amounts of PM collections of all the catalysts while activating all the catalysts without delay.

The exhaust gas purification apparatus according to the present invention may equip with auxiliary exhaust passages that connect portions of each of exhaust passages at downstream of corresponding catalysts with a portion of another exhaust passage between corresponding catalyst and its connecting portion with the upstream side communication passage, respectively, auxiliary switching valves that open and close auxiliary exhaust passages respectively, and cutoff valves that are arranged between connecting portions of exhaust passages with auxiliary exhaust passages at upstream of corresponding catalysts and connecting portions of exhaust passages with the upstream side communication passage, respectively, a downstream side communication passage that connect mutually portions of respective exhaust passages between their connecting portions with auxiliary exhaust passages and respective catalysts, and a downstream side switching valve that open and close the downstream side communication passage, wherein flow rate regulation valves are arranged in exhaust passages between their connecting portions with the downstream side communication passage and their connecting portions with auxiliary exhaust passages at the downstream of said catalysts, respectively.

In the exhaust gas purification apparatus constructed in this manner, for example, the control section controls to open the upstream side switching valve and the downstream side switching valve that are arranged in the upstream side communication passage and the downstream side communication passage which are connecting the specific exhaust passage and the other exhaust passage with each other, to open the cutoff valve in the specific exhaust passage, to close the flow rate regulation valve in the specific exhaust passage, to open the cutoff valve in the other exhaust passage, to close the flow rate regulation valve in the other exhaust passage, to close the auxiliary switching valve in the auxiliary exhaust passage that connects a portion of the specific exhaust passage at downstream of the specific catalyst therein and a portion of the other exhaust passage at upstream of the other catalyst therein, and to further close the auxiliary switching valve in the auxiliary exhaust passage that connects a portion of the specific exhaust passage at upstream of the specific catalyst therein and a portion of the other exhaust passage at downstream of the other catalyst therein.

In this case, the entire exhaust gas discharged from the internal combustion engine to the specific exhaust passage flows into the other exhaust passage through the upstream side communication passage. The exhaust gas flowing from the specific exhaust passage into the other exhaust passage flows into the other catalyst in the other exhaust passage together with the exhaust gas discharged from the internal combustion engine to the other exhaust passage. The exhaust gas flowing out from the other catalyst flows into the specific exhaust passage from the other exhaust passage through the downstream side communication passage. The exhaust gas flowing into the specific exhaust passage flows back through the specific catalyst arranged therein from a downstream side to an upstream side thereof, and then flows from a portion of the specific exhaust passage at upstream of the specific catalyst into a portion of the other passage at downstream of the other catalyst (a portion of the other passage downstream of the flow rate regulation valve arranged therein) through the auxiliary exhaust passage.

That is, the entire exhaust gas discharged from the internal combustion engine to the specific exhaust passage and the other exhaust passage flows back through the specific catalyst after passing through the other catalyst. If the flow of the exhaust gas as stated above is achieved during the PM regeneration processing of the specific catalyst (preferably, during the PM regeneration processing after the termination of the temperature raising processing), it becomes possible to prevent a part of the PM in the specific catalyst (e.g., the PM collected in an upstream portion of the specific catalyst) from remaining unoxidized therein.

DESCRIPTION OF THE PREFERRED EMBODIMENT

Hereinafter, preferred embodiments of the present invention will be described while referring to the accompanying drawing.

First Embodiment

Figure 1:
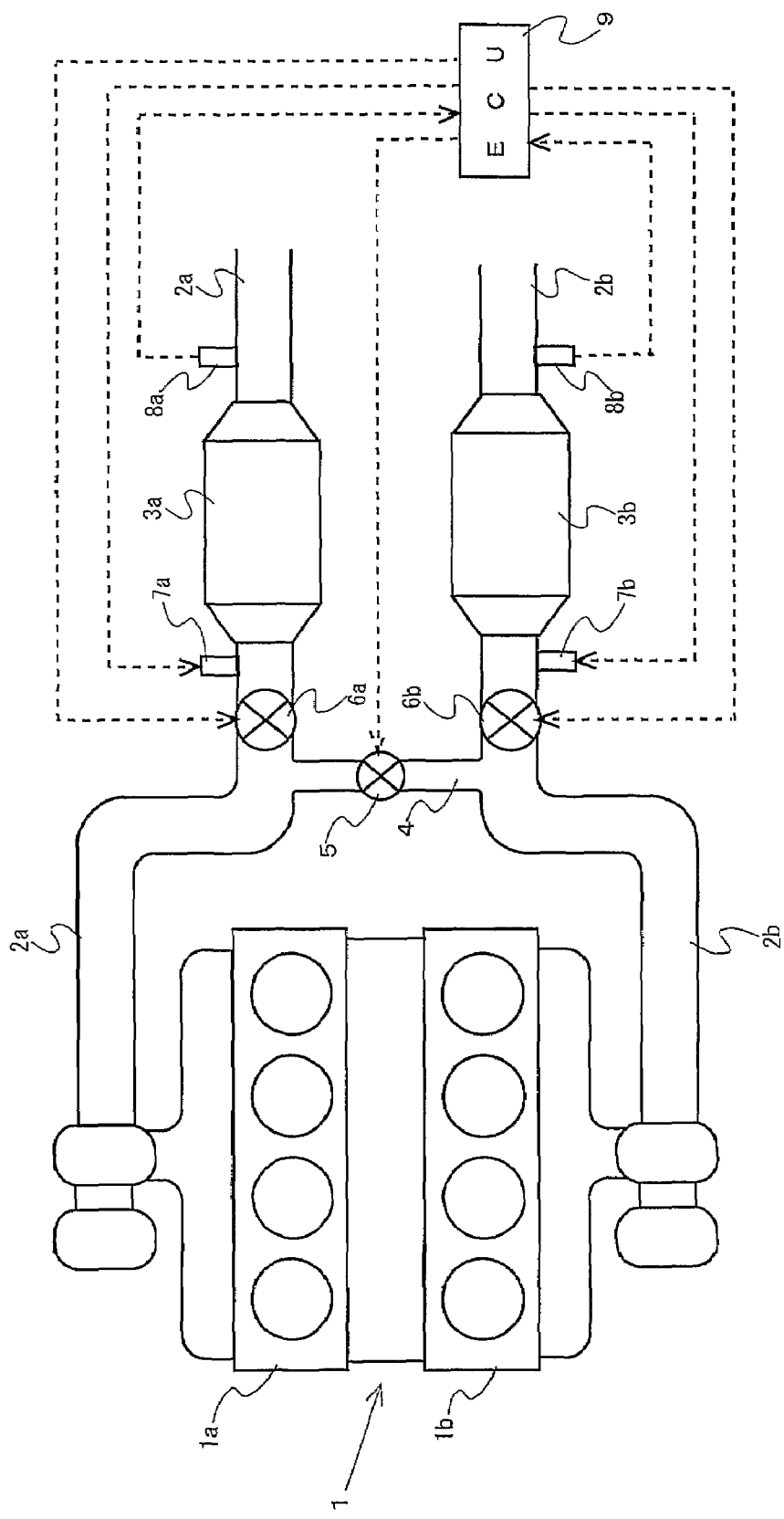
FIG. 1 is a view showing the schematic construction of an internal combustion engine to which a first embodiment of the present invention is applied.
Figure 2:
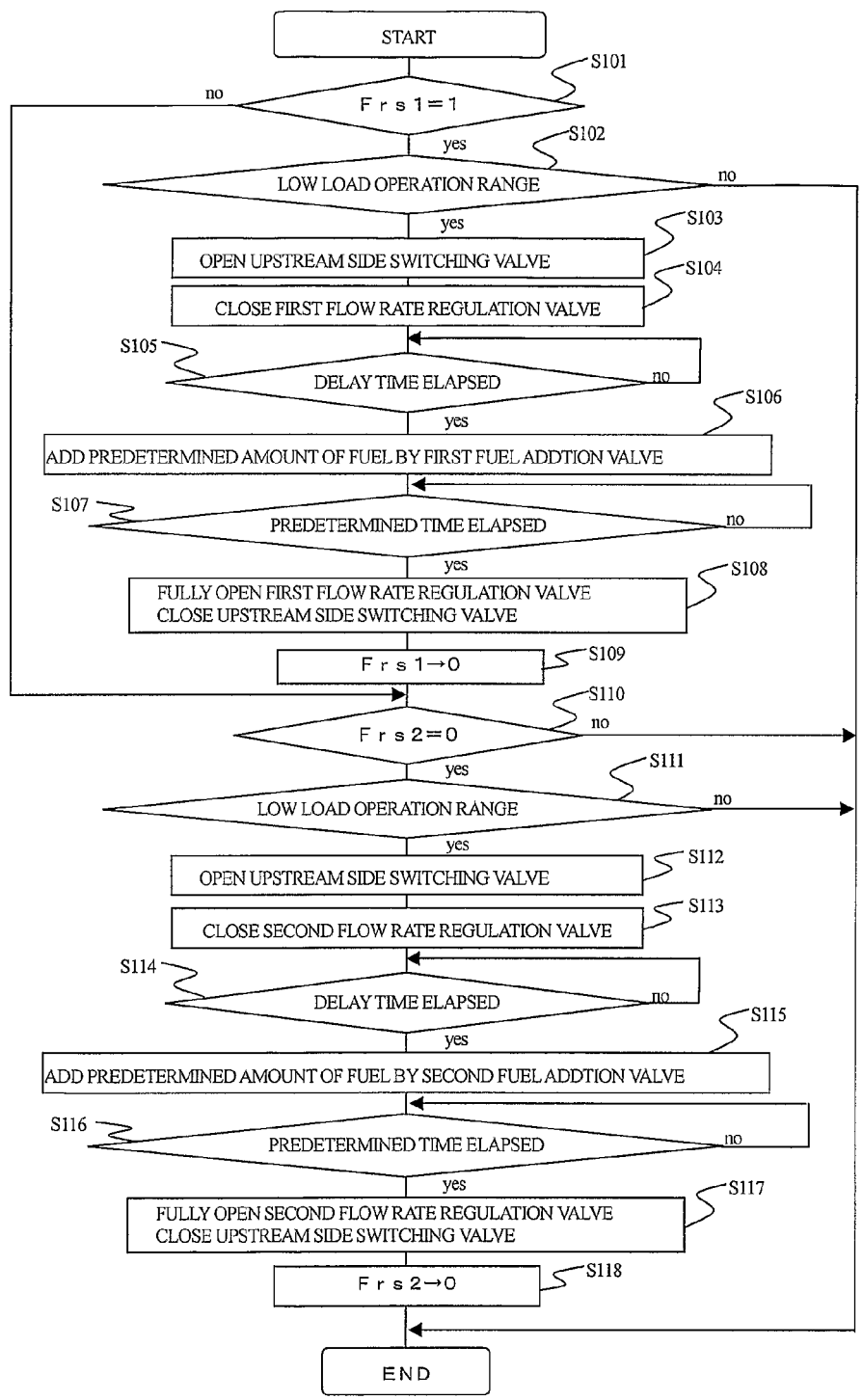
FIG. 2 is a flow chart illustrating a NOx trapping ability regeneration control routine.

First of all, a first embodiment of the present invention will be described based on FIGS. 1 through 3. FIG. 1 is a view that shows the schematic construction of an internal combustion engine to which the present invention is applied. The internal combustion engine, generally designated at 1 in FIG. 1, is a compression-ignition type internal combustion engine (e.g., diesel engine) in which a first cylinder group (first bank) 1a and a second cylinder group (second bank) 1b are arranged in a V shape.

A first exhaust passage 2a and a second exhaust passage 2b are connected with the first and second banks 1a, 1b, respectively. A first NOx storage and reduction type catalyst 3a and a second NOx storage and reduction type catalyst 3b are arranged in the first and second exhaust passages 2a, 2b, respectively. Each of the first and second NOx storage and reduction type catalysts 3a, 3b is a catalytic converter in which an NOx storage and reduction type catalyst is carried or supported, and which is one example of a catalyst according to the present invention.

A portion of the first exhaust passage 2a at upstream of the first NOx storage and reduction type catalyst 3a and a portion of the second exhaust passage 2b at upstream of the second NOx storage and reduction type catalyst 3b are connected with each other by the upstream side communication passage 4. An upstream side switching valve 5 for switching between the conduction and interruption of the upstream side communication passage 4 is arranged in an intermediate portion of the upstream side communication passage 4.

A first flow rate regulation valve 6a is arranged in the first exhaust passage 2a at downstream of its connecting portion with the upstream side communication passage 4. Although in FIG. 1, the first flow rate regulation valve 6a is arranged at upstream of the first NOx storage and reduction type catalyst 3a, it may be arranged at downstream of the first NOx storage and reduction type catalyst 3a.

A second flow rate regulation valve 6b is arranged in the second exhaust passage 2b at downstream of its connecting portion with the upstream side communication passage 4. Although in FIG. 1, the second flow rate regulation valve 6b is arranged at upstream of the second NOx storage and reduction type catalyst 3b, it may be arranged at downstream of the second NOx storage and reduction type catalyst 3b.

A first fuel addition valve 7a is arranged in the first exhaust passage 2a between the first flow rate regulation valve 6a and the first NOx storage and reduction type catalyst 3a. A second fuel addition valve 7b is arranged in the second exhaust passage 2b between the second flow rate regulation valve 6b and the second NOx storage and reduction type catalyst 3b. The first and second fuel addition valves 7a, 7b are one example of a reducing agent addition valve according to the present invention.

A first air-fuel ratio sensor 8a is arranged in the first exhaust passage 2a at a location downstream of the first NOx storage and reduction type catalyst 3a. A second air-fuel ratio sensor 8b is arranged in the second exhaust passage 2b at a location downstream of the second NOx storage and reduction type catalyst 3b.

An electronic control unit (ECU) 9 is provided together with the internal combustion engine 1 as constructed in this manner. The ECU 9 comprises an arithmetic logic operational circuit including a CPU, a ROM, a RAM, a backup RAM, etc. Sensors such as the first and second air-fuel ratio sensors 8a, 8b, etc., are electrically connected to this ECU 9. Also, the upstream side switching valve 5, the first and second flow rate regulation valves 6a, 6b, and the first and second fuel addition valves 7a, 7b are electrically connected to the ECU 9.

The ECU 9 identifies the operating condition of the internal combustion engine 1 from an output signal of an unillustrated crank position sensor, an unillustrated accelerator position sensor or the like, and electrically controls the internal combustion engine 1 and the above-mentioned respective parts based on the thus identified engine operating condition.

For example, the ECU 9 carries out, in addition to known control such as fuel injection control, etc., the regeneration processing of the NOx trapping abilities (NOx absorption abilities or NOx occlusion abilities) of the first and second NOx storage and reduction type catalysts 3a, 3b. As the treatment of regenerating the NOx trapping abilities, there are exemplified NOx regeneration processing that reduces and pulifies the NOx absorbed or occluded in the first and second NOx storage and reduction type catalysts 3a, 3b, SOx poisoning recovery processing that recovers the first and second NOx storage and reduction type catalysts 3a, 3b from SOx poisoning, etc.

In the NOx regeneration processing and the SOx poisoning recovery processing (hereinafter referred to simply as NOx trapping ability regeneration processing), it is necessary to lower the air-fuel ratio of the exhaust gas flowing into the first or second NOx storage and reduction type catalyst 3a or 3b to the stoichiometric air-fuel ratio or a rich air-fuel ratio, so the ECU 9 reduces the air-fuel ratio of the exhaust gas by adding fuel from the first or second fuel addition valve 7a or 7b to the exhaust gas up to the stoichiometric air-fuel ratio or the rich air-fuel ratio.

However, when the flow rate of exhaust gas is increased at the time when it is necessary to lower the air-fuel ratio of the exhaust gas flowing into the first or second NOx storage and reduction type catalyst 3a or 3b to the stoichiometric air-fuel ratio or the rich air-fuel ratio, a large amount of fuel from the first or second fuel addition valve 7a or 7b has to be added to the exhaust gas, as a result of which the fuel mileage is deteriorated.

In addition, when the flow rate of the exhaust gas is high, the flow speed of the exhaust gas becomes high, so the fuel added from the first or second fuel addition valve 7a or 7b passes through the first or second NOx storage and reduction type catalyst 3a or 3b at a high speed. That is, when the flow rate of the exhaust gas is high, not only the time for which the first or second NOx storage and reduction type catalyst 3a or 3b is exposed to the rich atmosphere is apt to become short but also the space velocity (sv) of the fuel flowing into the first or second NOx storage and reduction type catalyst 3a or 3b becomes high.

In this case, there arises the need to extent the time of fuel addition of the first or second fuel addition valve 7a or 7b so that the time for which the first or second fuel addition valve 7a or 7b is exposed to the rich atmosphere can be extended. As a result, there is a problem of causing further deterioration of fuel mileage.

In order to cope with such a problem, according to this embodiment, when the NOx trapping ability regeneration processing of the first or second NOx storage and reduction type catalyst 3a or 3b is performed, the ECU 9 lowers the flow rate and the flow speed of the exhaust gas flowing into the first and second NOx storage and reduction type catalysts 3a, 3b according to the following method. Here, it is assumed that at times other than the execution of the NOx trapping ability regeneration processing, the upstream side switching valve 5 is kept fully closed and the first and second flow rate regulation valves 6a, 6b are kept fully opened.

First of all, in the case of regenerating the NOx trapping ability of the first NOx storage and reduction type catalyst 3a, the ECU 9 first opens the upstream side switching valve 5, and decreases the degree of opening of the first flow rate regulation valve 6a to a value less than that of the second flow rate regulation valve 6b simultaneously with or after opening of the upstream side switching valve 5.

The reason why the timing of changing the opening degree of the first flow rate regulation valve 6a is made later than the timing of opening the upstream side switching valve 5 is that if the degree of opening of the first flow rate regulation valve 6a is decreased earlier than the upstream side switching valve 5 is opened, the back pressure in the first exhaust passage 2a might be varied to influence the operating condition of the internal combustion engine 1 (particularly, the first bank 1a).

When the upstream side switching valve 5 is opened and the degree of opening of the first flow rate regulation valve 6a is decreased, a part of the exhaust gas emitted from the first bank 1a to the first exhaust passage 2a comes to flow into the second exhaust passage 2b through the upstream side communication passage 4. As a result, the flow rate of the exhaust gas flowing into the first NOx storage and reduction type catalyst 3a decreases.

When the flow rate of the exhaust gas flowing into the first NOx storage and reduction type catalyst 3a is decreased, the amount of fuel to be added from the first fuel addition valve 7a can be decreased so as to control the air-fuel ratio of the exhaust gas flowing into the first NOx storage and reduction type catalyst 3a to be the stoichiometric air-fuel ratio or a rich air-fuel ratio.

Also, when the flow rate of the exhaust gas flowing into the first NOx storage and reduction type catalyst 3a is decreased, the flow speed of the exhaust gas flowing into the first NOx storage and reduction type catalyst 3a decreases, so the time for which the first NOx storage and reduction type catalyst 3a is exposed to the rich atmosphere becomes longer and at the same time the space velocity (sv) of the added fuel decreases. As a result, the NOx purification rate in the first NOx storage and reduction type catalyst 3a is raised.

Accordingly, if the flow rate (amount) and the flow speed of the exhaust gas flowing into the first NOx storage and reduction type catalyst 3a are lowered, as stated above, it becomes possible to regenerate the NOx trapping ability of the first NOx storage and reduction type catalyst 3a by the addition of a small amount of fuel for a short time.

If the flow of the exhaust gas can be stopped at the instant when the fuel added from the first fuel addition valve 7a to the exhaust gas has arrived at the first NOx storage and reduction type catalyst 3a, the added fuel comes to stay in the first NOx storage and reduction type catalyst 3a, so the NOx purification rate of the first NOx storage and reduction type catalyst 3a can be further raised, and the amount of fuel to be added from the first fuel addition valve 7a can be further decreased.

In order to stop the flow of the exhaust gas at the instant when the added fuel has arrived at the first NOx storage and reduction type catalyst 3a, the operation timing of the first flow rate regulation valve 6a and the first fuel addition valve 7a need only be controlled in such a manner that the actual degree of opening of the first flow rate regulation valve 6a becomes fully closed at the instant when the fuel added from the first fuel addition valve 7a to the exhaust gas has arrived at the first NOx storage and reduction type catalyst 3a.

The first flow rate regulation valve 6a will cause a response delay from the time of receipt of a fully closing command signal from the ECU 9 until when the actual degree of opening becomes a fully closed opening. A response delay occurs until when the added fuel from the first fuel addition valve 7a arrives at the first NOx storage and reduction type catalyst 3a.

In this embodiment, since the first fuel addition valve 7a is arranged in the immediate upstream of the first NOx storage and reduction type catalyst 3a, and the flow speed of the exhaust gas is sufficiently faster than the operation speed of the first flow rate regulation valve 6a, the response delay time until the added fuel from the first fuel addition valve 7a arrives at the first NOx storage and reduction type catalyst 3a becomes shorter than the response delay time of the first flow rate regulation valve 6a.

Accordingly, the ECU 9 is designed to output a fuel addition command signal to the first fuel addition valve 7a in a period from the time when the fully closing command signal is output to the first flow rate regulation valve 6a until the time when the actual degree of opening of the first flow rate regulation valve 6a becomes the fully closed opening. Specifically, the ECU 9 outputs the fuel addition command signal to the first fuel addition valve 7a after a predetermined delay time has elapsed from the time when the fully closing command signal to the first flow rate regulation valve 6a has been output.

In this case, the actual degree of opening of the first flow rate regulation valve 6a becomes fully closed substantially simultaneously at the time when the added fuel from the first fuel addition valve 7a has arrived at the first NOx storage and reduction type catalyst 3a, so the added fuel comes to stay in the first NOx storage and reduction type catalyst 3a. As a result, by the addition of a small amount of fuel for a short period of time, it becomes to keep the first NOx storage and reduction type catalyst 3a in a rich atmosphere for an extended period of time as well as to make the space velocity (sv) of the added fuel as low as possible.

The response delay time of the first flow rate regulation valve 6a becomes substantially a constant time depending on the hardware of the first flow rate regulation valve 6a. On the other hand, the higher the flow speed of the exhaust gas, the shorter does the response delay time of the added fuel becomes. Also, the higher the number of revolutions per minute of the engine, or the larger the amount of intake air, the higher does the flow speed of the exhaust gas become. Accordingly, it is preferable that the above-mentioned delay time be set longer in accordance with the increasing number of revolutions per minute of the engine or the increasing amount of intake air.

In addition, when the first flow rate regulation valve 6a is fully closed, the entire exhaust gas emitted from the first bank 1a will flow in the second NOx storage and reduction type catalyst 3b. That is, the entire exhaust gas emitted from the first bank 1a and the second bank 1b (the entire exhaust gas emitted from the internal combustion engine 1) will flow in the second NOx storage and reduction type catalyst 3b.

Therefore, if the first flow rate regulation valve 6a is fully closed when a large amount of NOx is emitted from the internal combustion engine 1, there will be a possibility that the second NOx storage and reduction type catalyst 3b can not treat the NOx of the exhaust gas. In contrast to this, though a method of increasing the capacity of the second NOx storage and reduction type catalyst 3b is considered, there is a possibility of lowering warm-up performance and vehicle mountability.

Accordingly, in this embodiment, when the amount of NOx emitted from the internal combustion engine 1 (hereinafter referred to as the amount of NOx emission) is relatively small, the regeneration processing of the NOx trapping ability as stated above is carried out. The amount of NOx emission changes in accordance with the load of the internal combustion engine 1. That is, the amount of NOx emission decreases in accordance with the lowering load of the internal combustion engine 1. Therefore, the ECU 9 needs only to execute the NOx trapping ability regeneration processing when the load of the internal combustion engine 1 is lower than a predetermined load. The predetermined load is set to be equal to or slightly lower than a maximum load within a range in which the amount of NOx emission does not exceeds the NOx trapping ability of the second NOx storage and reduction type catalyst 3b.

Next, in the case of regenerating the NOx trapping ability of the second NOx storage and reduction type catalyst 3b, the ECU 9 controls the upstream side switching valve 5, the second flow rate regulation valve 6b and the second fuel addition valve 7b according to a method similar to that used in the case of regenerating the NOx trapping ability of the first NOx storage and reduction type catalyst 3a. In this case, too, the NOx trapping ability of the second NOx storage and reduction type catalyst 3b comes to be regenerated by the addition of a small amount of fuel for a short time, similar to the first NOx storage and reduction type catalyst 3a.

Hereinafter, reference will be made to the NOx trapping ability regeneration control in this embodiment while referring to FIG. 2. FIG. 2 is a flow chart that illustrates a NOx trapping ability regeneration control routine. This NOx trapping ability regeneration control routine is a routine intended for the NOx regeneration processing in which the NOx absorbed in the first or second NOx storage and reduction type catalyst 3a or 3b is reduced and purified.

In the NOx trapping ability regeneration control routine, the ECU 9 determines in step S101 whether the value of a first regeneration flag Frs1 is "1". The first regeneration flag Frs1 is a flag in which "1" is set when the time elapsed from the termination of the last execution of the NOx regeneration processing by the first NOx storage and reduction type catalyst 3a becomes equal to or longer than a predetermined time, or when the amount of NOx absorption (or the amount of NOx absorption) of the first NOx storage and reduction type catalyst 3a becomes equal to or more than a predetermined amount, whereas "0" is reset at the termination of the execution of the NOx regeneration processing.

When a positive determination is made in step S101, the ECU 9 advances to step S102 (Frs1=1). In step S102, the ECU 9 determines whether the operating condition of the internal combustion engine is in a low load operation range. That is, the ECU 9 determines whether the amount of NOx emission is less than the NOx trapping ability of the second NOx storage and reduction type catalyst 3b. As such a specific determination method, there is exemplified one in which if the degree of opening of an accelerator pedal is less than a predetermined degree of opening or if the amount of fuel injection is less than a predetermined amount, it is determined that the operating condition of the internal combustion engine 1 is in a low load operation range (i.e., the amount of NOx emission is less than the NOx trapping ability of the second NOx storage and reduction type catalyst 3b).

When a positive determination is made in step S102, the ECU 9 advances to step S103. In step S103, the ECU 9 opens the upstream side switching valve 5.

In step S104, the ECU 9 fully closes the first flow rate regulation valve 6a. Subsequently, the ECU 9 determines in step S105 whether the time elapsed from the time point when a fully closing command signal to the first flow rate regulation valve 6a was output becomes equal to or longer than the delay time. The delay time is set in such a manner that it is shorter than the response delay time of the first flow rate regulation valve 6a, and it becomes longer in accordance with the increasing number of revolutions per minute of the engine or the increasing amount of intake air.

When a negative determination is made in step S105, the ECU 9 executes the processing in step S105 in a repeated manner until the delay time elapses. When a positive determination is made in step S105, the ECU 9 advances to step S106. In step S106, the ECU 9 outputs a fuel addition signal so that a predetermined amount of fuel is added from the first fuel addition valve 7a. The above-mentioned predetermined amount of fuel may be a preset fixed amount or a variable amount that is changed in accordance with the amount of NOx absorption of the first NOx storage and reduction type catalyst 3a.

In step S107, the ECU 9 determines whether the time elapsed from the time point at which the fuel addition command signal to the first fuel addition valve 7a was output (i.e., substantially equal to the time for which the first flow rate regulation valve 6a is put into its fully closed state) is equal to or longer than a predetermined time. This predetermined time may be a preset fixed time or a variable value that is changed in accordance with the amount of NOx absorption of the first NOx storage and reduction type catalyst 3a.

When a negative determination is made step S107, the ECU 9 executes the processing in step S107 in a repeated manner until the above-mentioned predetermined time elapses. When a positive determination is made in step S107, the control process of the ECU 9 advances to step S108 where the NOx regeneration processing of the first NOx storage and reduction type catalyst 3a is terminated. Specifically, the ECU 9 outputs a fully opening command signal to the first flow rate regulation valve 6a and outputs a valve closing command signal to the upstream side switching valve 5. Subsequently, the ECU 9 resets the value of the first regeneration flag Frs1 to "0" in step S109.

When the NOx regeneration processing of the first NOx storage and reduction type catalyst 3a is performed in this manner, the first flow rate regulation valve 6a becomes fully closed at the instant when the fuel added from the first fuel addition valve 7a to the exhaust gas arrives at the first NOx storage and reduction type catalyst 3a, and the first flow rate regulation valve 6a comes to keep its fully closed state for a predetermined time.

In this case, the fuel added from the first fuel addition valve 7a stays in the first NOx storage and reduction type catalyst 3a for the predetermined time, so the space velocity (sv) of the added fuel is decreased. In addition, when the fuel added from the first fuel addition valve 7a stays in the first NOx storage and reduction type catalyst 3a, the inside of the first NOx storage and reduction type catalyst 3a is kept in a rich atmosphere even if the first fuel addition valve 7a does not continue the addition of fuel.

As a result, the NOx occluded in the first NOx storage and reduction type catalyst 3a becomes able to be reduced and purified in an appropriate manner by the addition of a small amount of fuel for a short time.

Then, when a negative determination is made in step S101, or when the execution of the processing in step S109 is terminated, the control process of the ECU 9 advances to step S110 where it is determined whether the value of a second regeneration flag Frs2 is "1". The second regeneration flag Frs2 is a flag in which "1" is set when the time elapsed from the termination of the last execution of the NOx regeneration processing by the second NOx storage and reduction type catalyst 3b becomes equal to or longer than a predetermined time, or when the amount of NOx absorption of the second NOx storage and reduction type catalyst 3b becomes equal to or more than a predetermined amount, whereas "0" is reset at the termination of the execution of the NOx regeneration processing.

When a negative determination is made (Frs2=0) in step S110, the ECU 9 terminates the execution of this routine. When a positive determination is made in step S110, the ECU 9 performs the NOx regeneration processing of the second NOx storage and reduction type catalyst 3b in steps S111 through S118. In that case, the ECU 9 controls the upstream side switching valve 5, the second flow rate regulation valve 6b, and the second fuel addition valve 7b according to a method similar to that used in the NOx regeneration processing of the first NOx storage and reduction type catalyst 3a as stated above.

When the NOx regeneration processing of the second NOx storage and reduction type catalyst 3b is performed in this manner, the second flow rate regulation valve 6b becomes fully closed at the instant when the fuel added from the second fuel addition valve 7b to the exhaust gas arrives at the second NOx storage and reduction type catalyst 3b, and the second flow rate regulation valve 6b comes to keep its fully closed state for a predetermined time.

In this case, the fuel added from the second fuel addition valve 7b stays in the second NOx storage and reduction type catalyst 3b for the predetermined time, so the space velocity (sv) of the added fuel is decreased. In addition, when the fuel added from the second fuel addition valve 7b stays in the second NOx storage and reduction type catalyst 3b, the inside of the second NOx storage and reduction type catalyst 3b is kept in a rich atmosphere even if the second fuel addition valve 7b does not continue the addition of fuel.

As a result, the NOx occluded in the second NOx storage and reduction type catalyst 3b becomes able to be reduced and purified in an appropriate manner by the addition of a small amount of fuel for a short time.

According to the embodiment described above, when the NOx trapping ability of the first or second NOx storage and reduction type catalyst 3a or 3b is regenerated, the flow rate and the flow speed of the exhaust gas flowing into the first or second NOx storage and reduction type catalyst 3a or 3b can be lowered in an approved manner. In particular, when the first or second flow rate regulation valve 6a or 6b is fully closed at the instant when the added fuel has arrived at the first or second NOx storage and reduction type catalyst 3a or 3b, it becomes possible to regenerate the NOx trapping ability of the first or second NOx storage and reduction type catalyst 3a or 3b with a small amount of the added fuel even if the flow rate of the exhaust gas discharged from the internal combustion engine 1 is increased.

As a result, the amount of fuel required to regenerate the NOx trapping abilities of the first and second NOx storage and reduction type catalysts 3a, 3b can be suppressed to a minimum, thus making it possible to prevent the deterioration of fuel economy.

Here, note that in this embodiment, as an example of an internal combustion engine to which the present invention is applied, there has been enumerated a V-type internal combustion engine, but the present invention is of course not limited to this, and hence it needs only to be constructed such that an internal combustion engine has a plurality of cylinder groups with an independent exhaust passage and an independent NOx storage and reduction type catalyst being provided for each cylinder group.

Figure 3:
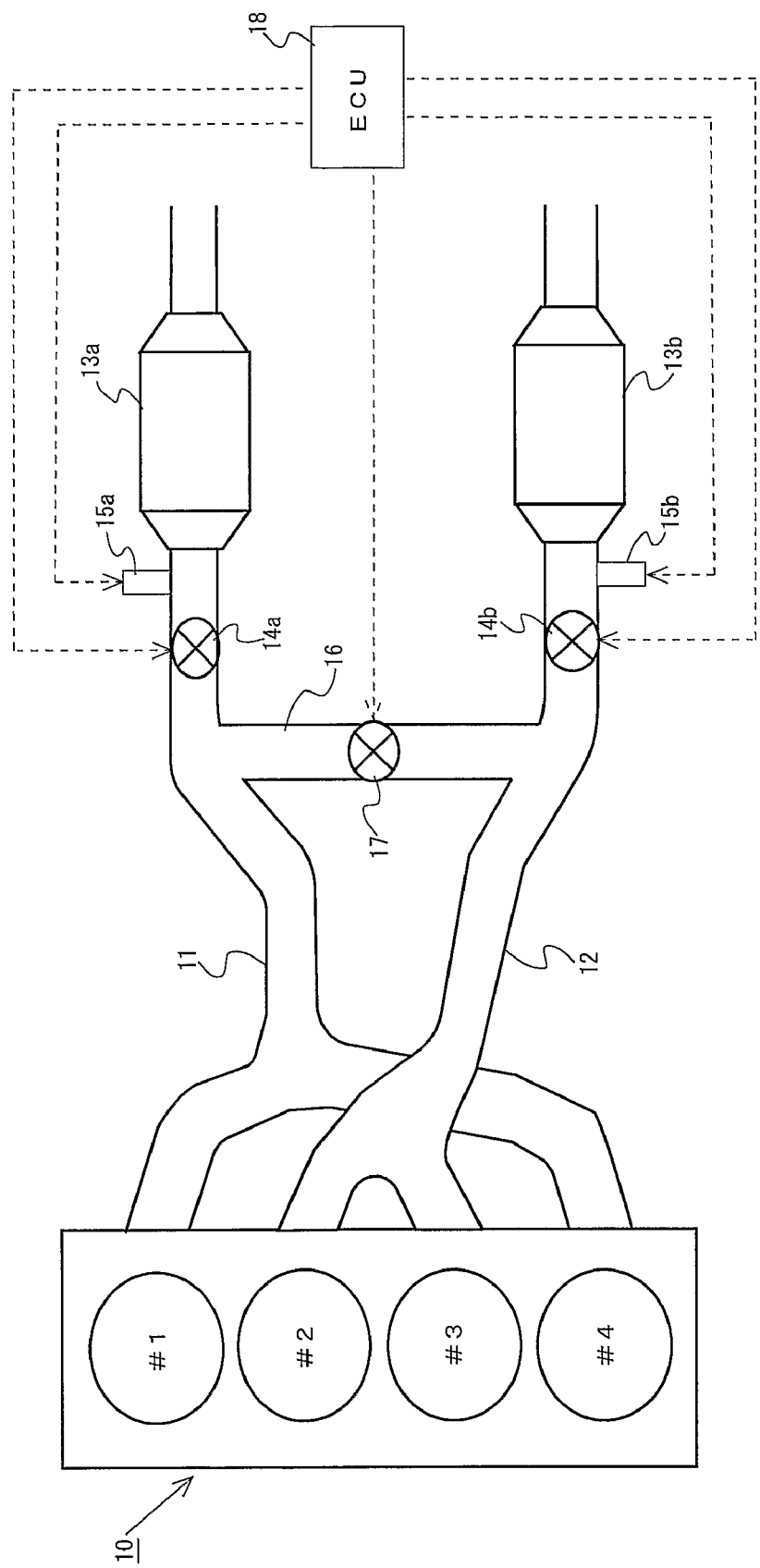
FIG. 3 is a view showing another constructional example of an internal combustion engine to which the first embodiment of the present invention is applied.

For example, the present invention can be applied to the case where, as shown in FIG. 3, an in-line type internal combustion engine 10 includes cylinders which are classified into two cylinder groups (e.g., in an example shown in FIG. 3, a first cylinder group including a first cylinder (#1) and a fourth cylinder (#4), and a second cylinder group including a second cylinder (#2) and a third cylinder #3)), independent exhaust passages 11, 12 and NOx storage and reduction type catalysts 13a, 13b for the cylinder groups, respectively.

The apparatus in that case can be constructed such that it includes a communication passage 16 that serves to place the portions of the exhaust passages 11, 12 at upstream of the NOx storage and reduction type catalysts 13a, 13b, respectively, in communication with each other, an upstream side switching valve 17 that serves to open and close the communication passage 16, fuel addition valves 15a, 15b that are arranged at downstream of the connecting portions, respectively, of the exhaust passages 11, 12 with the communication passage 16 and upstream of the NOx storage and reduction type catalysts 13a, 13b, respectively, and flow rate regulation valves 14a, 14b that are arranged at downstream of the connecting portions, respectively, of the exhaust passages 11, 12 with the communication passage 16. Also, an ECU 18 needs only to control the upstream side switching valve 17, the flow rate regulation valves 14a, 14b, the fuel addition valves 15a, 15b in accordance with a procedure similar to the above-mentioned routine in FIG. 2.

Second Embodiment

Now, reference will be made to a second embodiment of the present invention based on FIGS. 4 through 7. Here, those portions of the construction of this embodiment which are different from those of the above-mentioned first embodiment will be described while omitting an explanation about similar construction portions.

Figure 4:
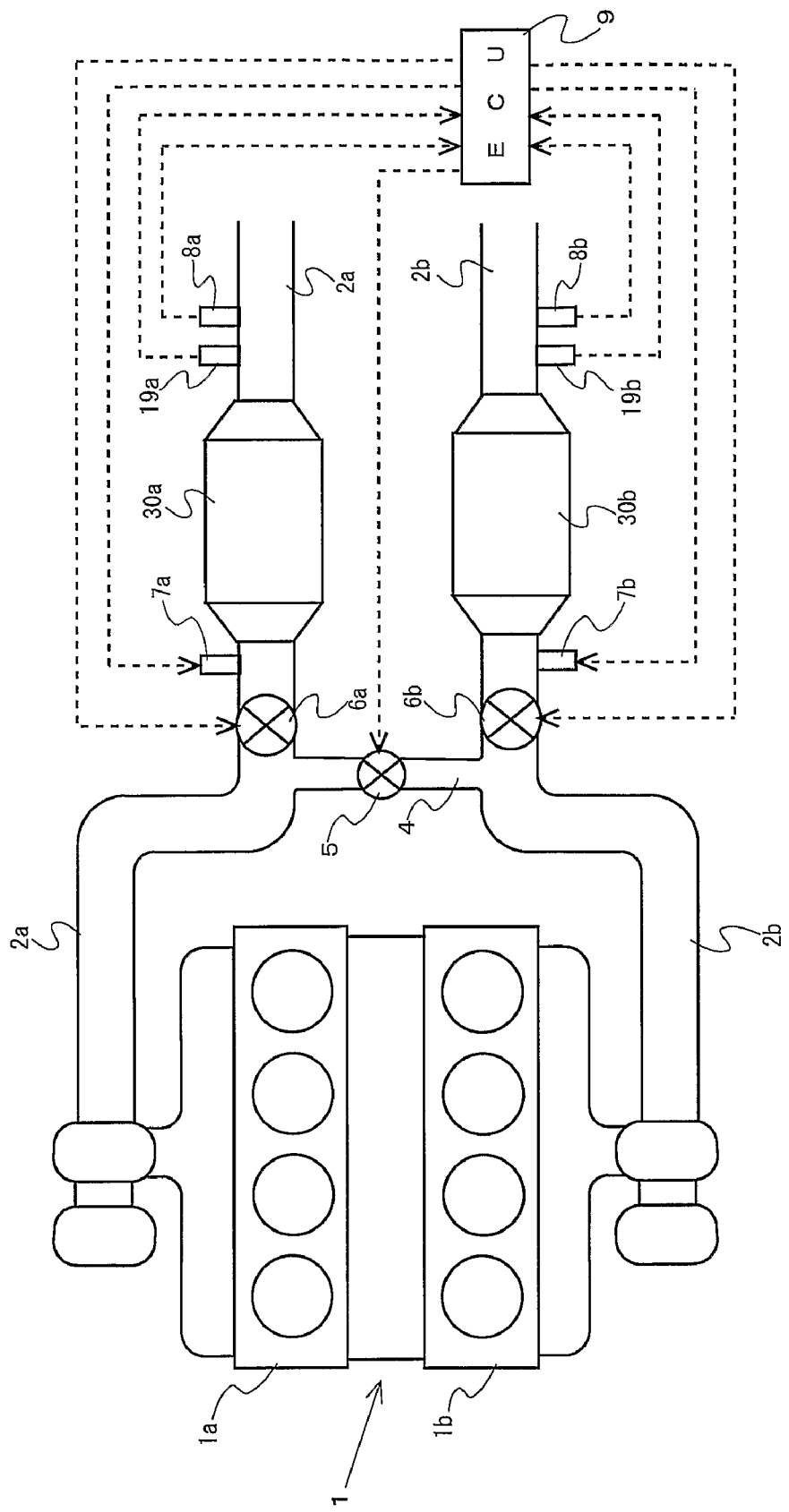
FIG. 4 is a view showing the schematic construction of an internal combustion engine to which a second embodiment of the present invention is applied.

FIG. 4 is a view that shows the schematic construction of an internal combustion engine to which the present invention is applied. In FIG. 4, instead of the first NOx storage and reduction type catalyst 3a and the second NOx storage and reduction type catalyst 3b, a first filter 30a and a second filter 30b are arranged in the first exhaust passage 2a and the second exhaust passage 2b, respectively.

Each of the first filter 30a and the second filter 30b is a particulate filter that serves to capture or collect particulate matter (PM) in the exhaust gas. Also, each of the first filter 30a and the second filter 30b is provided with a catalyst having oxidizing ability (e.g., an oxidation catalyst, an occlusion and reduction type NOx catalyst, a three-way catalyst, etc.). In that case, the catalyst having oxidizing ability may be arranged in the immediate upstream of the particulate filter or may be carried by a carrier of the particulate filter. Here, it is assumed that the PM capturing or collecting capacities of the first filter 30a and the second filter 30b are the same with each other.

A first exhaust gas temperature sensor 19a is arranged in a portion of the first exhaust passage 2a downstream of the first filter 30a. A second exhaust gas temperature sensor 19b is arranged in a portion of the second exhaust passage 2b downstream of the second filter 30b. Here, note that in case where each of the first filter 30a and the second filter 30b is composed of an oxidation catalyst and a particulate filter arranged in series with each other, an exhaust gas temperature sensor may be arranged between the oxidation catalyst and the particulate filter.

In the internal combustion engine 1 as constructed in this manner, the ECU 9 performs the processing of controlling the upstream side switching valve 5, the first flow rate regulation valve 6a and the second flow rate regulation valve 6b in such a manner that the entire exhaust gas from the internal combustion engine 1 can pass through only either one of the first filter 30a and the second filter 30b in a predetermined period of time from engine starting, while changing the one filter at each engine starting (hereinafter, such processing being referred to as engine start time drift processing).

The amount of PM emitted from the internal combustion engine 1 has a tendency to increase during cold operation from the engine starting to the completion of warm-up operation (namely, during warm-up operation) rather than during warm operation after the completion of warm-up operation. This is because the combustion of a mixture is liable to become unstable in the internal combustion engine 1 during cold operation. In addition, the combustion stabilities of the first bank 1a and the second bank 1b do not easily become uniform during the cold operation of the internal combustion engine 1, so the amounts of PM emitted from the first bank 1a and the second bank 1b are apt to differ from each other. Accordingly, there is a possibility that the amounts of PM collections of the first filter 30a and the second filter 30b might become greatly different from each other.

In contrast to this, if the entire exhaust gas flows into only either one of the first filter 30a and the second filter 30b in a predetermined period of time from the startup of the internal combustion engine 1, i.e., during cold operation in which the amount of PM emitted from the internal combustion engine 1 becomes maximum, a large amount of PM will be collected in the one filter alone. Further, the period of execution of the PM regeneration processing becomes one for several trips, so if the above-mentioned one catalyst is changed at each startup of the internal combustion engine 1, the amounts of PM collections of the first filter 30a and the second filter 30b during the execution of the PM regeneration processing can be made substantially uniform.

In the engine start time exhaust gas flow control routine, the ECU 9 first determines step S201 whether the current engine starting is a cold start. As a method of such a determination, there is exemplified a determination method in which a determination of the current engine starting being a cold start is made when the temperature of engine cooling water is lower than a predetermined temperature, and/or when the temperature of engine lubricating oil is lower than a predetermined temperature.

When a positive determination is made in step S201, the ECU 9 executes engine start time drift processing in steps S202 through S208. In step S202, the ECU 9 determines whether the value of the regeneration flag is "0". The regeneration flag is set to "1" when the execution of the PM regeneration processing is completed, whereas it is set to "0" when the engine start time drift processing to be described later is executed.

When a positive determination is made in step S202 (i.e., when the value of the regeneration flag is "0"), that is, when the engine start time drift processing has been executed at least one time in a period of time from the time point of completion of the execution of the PM regeneration processing until the current point in time, the control process of the ECU 9 advances to step S203 where the history of the last engine start time drift processing (information for identifying whether the entire exhaust gas was caused to flow into the first filter 30a or the second filter 30b at the last cold start).

In step with S204, the ECU 9 determines, based on the history read in step S203, whether the filter through which the entire exhaust gas passed at the last cold start is the first filter 30a.

When a negative determination is made in step S204, the control process of the ECU 9 advances to step S206. In step S206, the ECU 9 controls the first flow rate regulation valve 6a, the second flow rate regulation valve 6b and the upstream side switching valve 5 so that the entire exhaust gas from the internal combustion engine 1 flows through the second filter 30a alone. Specifically, the ECU 9 controls these valves in such a manner that the first flow rate regulation valve 6a is fully opened, the second flow rate regulation valve 6b is fully closed, and the upstream side switching valve 5 is opened.

In this case, the entire exhaust gas emitted from the first bank 1a is directed to the second exhaust passage 2b through the first exhaust passage 2a and the upstream side communication passage 4. The exhaust gas directed to the second exhaust passage 2b flows into the second filter 30b, together with the exhaust gas emitted from the second bank 1b to the second exhaust passage 2b. As a result, all the exhaust gases emitted from the first bank 1a and the second bank 1b will flow through the second filter 30b alone without flowing through the first filter 30a.

When a negative determination is made in step S204, the control process of the ECU 9 advances to step S206. In step S206, the ECU 9 controls the first flow rate regulation valve 6a, the second flow rate regulation valve 6b and the upstream side switching valve 5 so that the entire exhaust gas from the internal combustion engine 1 flows through the first filter 30a alone. Specifically, the ECU 9 controls these valves in such a manner that the first flow rate regulation valve 6a is fully opened, the second flow rate regulation valve 6b is fully closed, and the upstream side switching valve 5 is closed.

In this case, the entire exhaust gas emitted from the second bank 1b is directed to the first exhaust passage 2a through the second exhaust passage 2b and the upstream side communication passage 4. The exhaust gas directed to the first exhaust passage 2a flows into the first filter 30a together with the exhaust gas emitted from the first bank 1a to the first exhaust passage 2a. As a result, all the exhaust gases emitted from the first bank 1a and the second bank 1b will flow through the first filter 30a alone without flowing through the second filter 30b.

The ECU 9, having executed the processing in step S205 or S206, determines in step S207 whether the warm up of the internal combustion engine 1 is completed. As a method of such a determination, there is exemplified a determination method in which a determination of the warm up of the internal combustion engine 1 being completed is made when the temperature of engine cooling water is equal to or higher than a predetermined temperature, and/or when the temperature of engine lubricating oil is equal to or higher than a predetermined temperature.

When a negative determination is made in step S207, the ECU 9 executes the processing in step S207 in a repeated manner until the warm up of the internal combustion engine 1 is completed. During that time, the entire exhaust gas emitted from the internal combustion engine 1 will flow through only either one of the first filter 30a and the second filter 30b, so all the PM emitted from the internal combustion engine 1 under cold operation comes to be collected by only either one of the first filter 30a and the second filter 30b.

When the warm up of the internal combustion engine 1 is completed, the ECU 9 will make a positive determination in step S207 and then advance to step S208. In step S208, the ECU 9 resets the value of the above-mentioned regeneration flag to "0".

In step S209, the ECU 9 controls the first flow rate regulation valve 6a, the second flow rate regulation valve 6b and the upstream side switching valve 5 so as to cause the exhaust gas to flow in an ordinary manner. That is, the ECU 9 controls these valves in such a manner that the first flow rate regulation valve 6a is fully opened, the second flow rate regulation valve 6b is also fully opened, and the upstream side switching valve 5 is closed.

In this case, the exhaust gas emitted from the first bank 1a flows through the first exhaust passage 2a and the first filter 30a, and the exhaust gas emitted from the second bank 1b flows through the second exhaust passage 2b and the second filter 30b.

When a negative determination is made in step S202 (i.e., when the value of the regeneration flag is "1"), it is assumed that the engine start time drift processing has not been executed even once in the period of time from the time point of completion of the execution of the PM regeneration processing until the current point in time. In this case, the amounts of PM collections of the first filter 30a and the second filter 30b in the current point in time become substantially equal to each other, so the ECU 9 executes the engine start time drift processing without considering the history of the last engine start time drift control. In that case, though in the example shown in FIG. 5, the ECU 9 executes the step S205 while skipping the steps S203 and S204, it may execute the step S206 while skipping steps S203 and S204.

In addition, when a negative determination is made in above-mentioned S201, that is, when the current engine starting is a warm start, the ECU 9 does not execute engine start time drift processing (processing in steps S202 through S208), but controls, in step S209, the first flow rate regulation valve 6a, the second flow rate regulation valve 6b and the upstream side switching valve 5 so as to cause the exhaust gas to flow in an ordinary manner.

This is because when the internal combustion engine 1 is warm started, the combustion of a mixture is less prone to become unstable, so a large amount of PM is not easily emitted from the internal combustion engine 1, and the amount of PM emission does not easily vary with the individual banks 1a, 1b.

Thus, the ECU 9 executes the engine start time exhaust gas flow control routine in this manner, whereby the timing at which the PM trapping ability of the first filter 30a is saturated (i.e., the timing at which the amount of PM collection of the first filter 30a reaches an upper limit amount) and the timing at which the PM trapping ability of the second filter 30b is saturated (i.e., the timing at which the amount of PM collection of the second filter 30b reaches an upper limit amount) can be made substantially the same timing.

If the timing at which the PM trapping ability of the first filter 30a is saturated and the timing at which the PM trapping ability of the second filter 30b is saturated become substantially the same timing, it is possible to perform the PM regeneration processing to the first filter 30a and the second filter 30b substantially at the same time. Accordingly, when the PM regeneration condition for either one of the first filter 30a and the second filter 30b is established, the ECU 9 performs the PM regeneration processing for the first filter 30a and the second filter 30b according to the following method.

Figure 6:
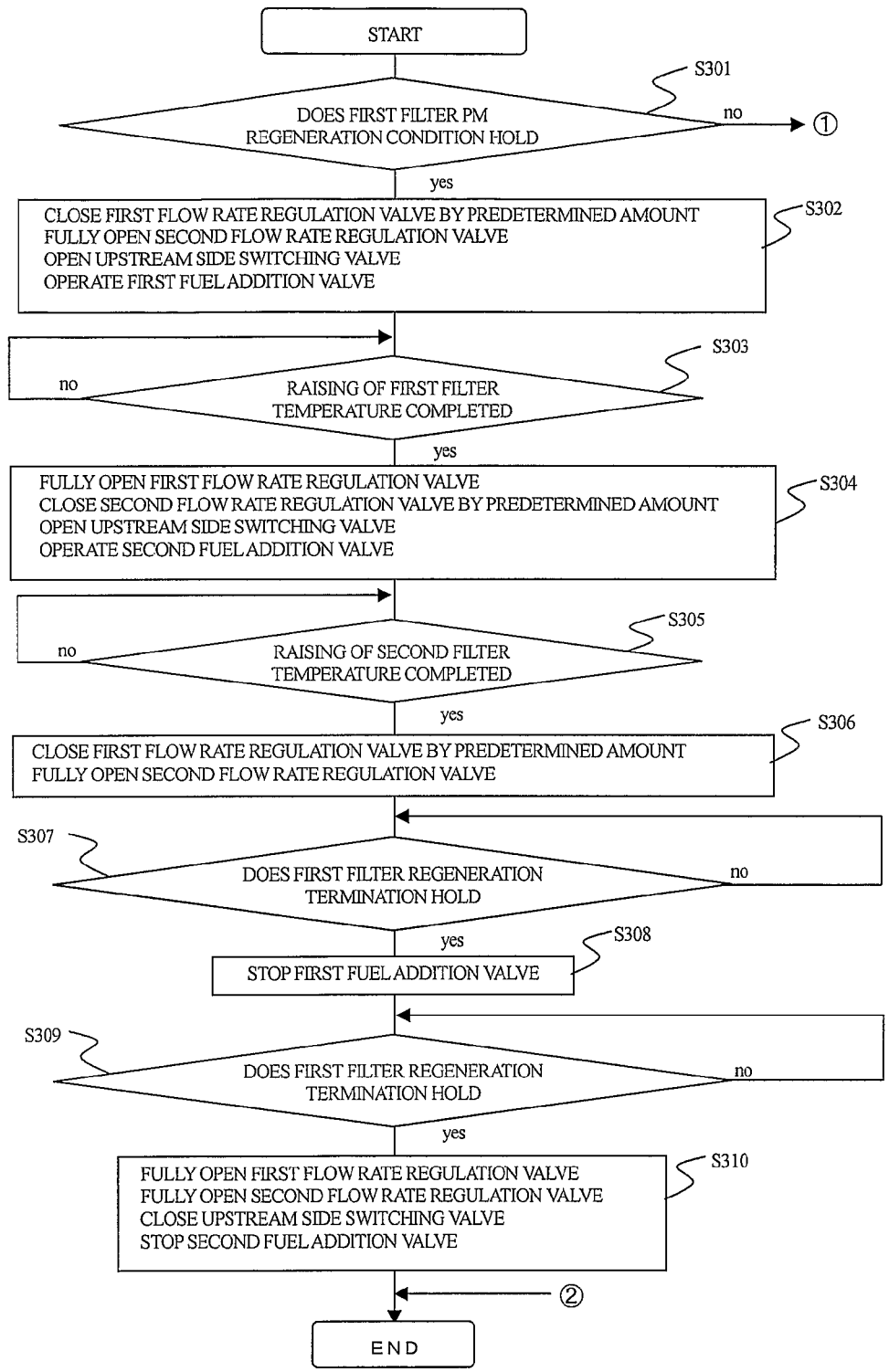
FIG. 6 is a first flow chart illustrating a PM regeneration processing routine in the second embodiment.
Figure 7:
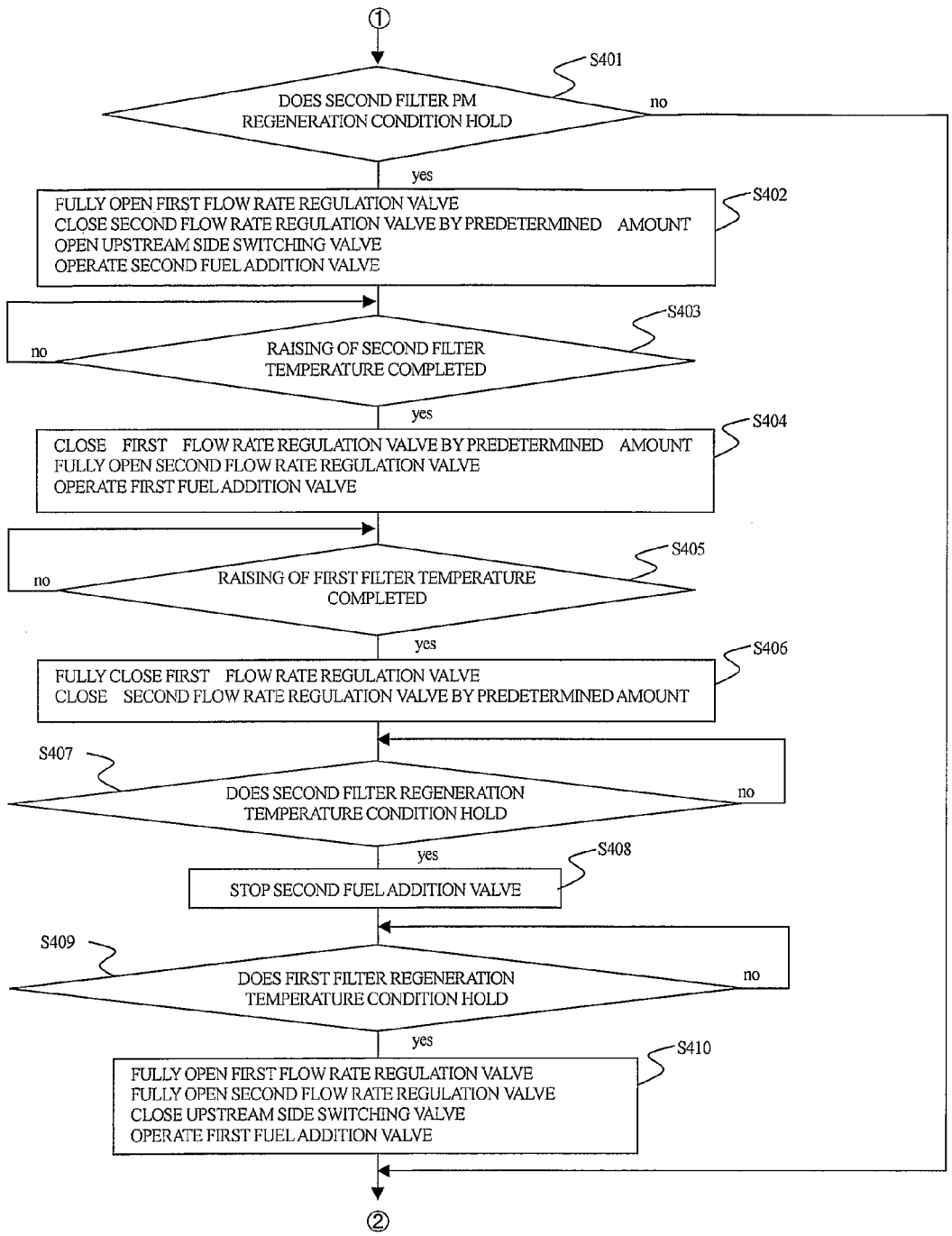
FIG. 7 is a second flow chart illustrating the PM regeneration processing routine in the second embodiment.

FIG. 6 and FIG. 7 are flow charts that together show PM regeneration processing routine in this embodiment. The PM regeneration processing routine is stored beforehand in the ROM of the ECU 9, and is executed in each predetermined cycle by the ECU 9.

In the PM regeneration processing routine, first in step S301, the ECU 9 determines whether the regeneration condition for the first filter 30a holds. As a method of such a determination, there are exemplified the following ones. That is, it is determined that the regeneration condition holds, when an accumulated operating time from the time point of the completion of the last execution of the PM regeneration processing is equal to or longer than a predetermined time, or when an accumulated amount of intake air from the last execution of the PM regeneration processing is equal to or more than a predetermined amount, or when an accumulated amount of injected fuel from the last execution of the PM regeneration processing is equal to or more than a predetermined amount, or when a differential pressure between the pressures of exhaust gases at locations upstream and downstream of the first filter 30a (the differential pressure before and after the filter) is equal to or higher than a predetermined pressure value.

When a positive determination is made in step S301, the control process of the ECU 9 proceeds to step S302 where temperature raising processing is executed. Specifically, in the temperature raising processing, the ECU 9 controls the above-mentioned valves 5, 6a, 6b, 7a in such a manner that the first flow rate regulation valve 6a is closed by a predetermined amount or angle, the second flow rate regulation valve 6b is fully opened, the upstream side switching valve 5 is opened, and the first fuel addition valve 7a is operated to inject fuel.

In this case, a part of the exhaust gas emitted from the first bank 1a to the first exhaust passage 2a flows into the second exhaust passage 2b through the upstream side communication passage 4, so the amount of the exhaust gas flowing into the first filter 30a is decreased, and the amount of the exhaust gas flowing into the second filter 30b is increased.

In addition, the fuel added from the first fuel addition valve 7a to the exhaust gas flows into the first filter 30a together with the exhaust gas. The added fuel flowing into the first filter 30a is oxidized by the oxidizing ability of the first filter 30a. As a result, the first filter 30a receives oxidation reaction heat of the added fuel and rises in temperature.

In that case, though a part of the heat of the first filter 30a is deprived by the exhaust gas passing through the first filter 30a, the amount of heat transmitted from the first filter 30a to the exhaust gas does not increase excessively since the amount of the exhaust gas flowing into the first filter 30a has been decreased. Accordingly, the first filter 30a comes to be quickly raised in temperature by a small amount of added fuel. Here, note that when the internal combustion engine 1 is operated under light load (i.e., an operating condition in which the amount of the exhaust gas discharged from the internal combustion engine 1 is small and the temperature of the exhaust gas is lower), the second fuel addition valve 7b is operated, instead of the first fuel addition valve 7a, to raise the temperature of the second filter 30b.

In step S303, the ECU 9 determines whether the rising in temperature of the first filter 30a has been completed, i.e., whether the temperature of the first filter 30a has risen up to a PM oxidizable temperature range (e.g., 600 degrees C. or above). As a method for such a determination, there can be exemplified one in which when the temperature of the exhaust gas detected by the first exhaust gas temperature sensor 19a reaches the PM oxidizable temperature range, it is determined that the rising in temperature of the first filter 30a is completed.

When a negative determination is made in step S303, the ECU 9 executes the processing in step S303 in a repeated manner until the temperature of the first filter 30a reaches the PM oxidizable temperature range. When the temperature of the first filter 30a rises up to the PM oxidizable temperature range, the ECU 9 makes a positive determination in step S303 and then advances to step S304.

Specifically, in step S304, the ECU 9 controls the above-mentioned valves 6a, 6b, 7b in such a manner that the first flow rate regulation valve 6a is fully opened, the second flow rate regulation valve 6b is closed by a predetermined amount, and the second fuel addition valve 7b is operated. In that case, the upstream side switching valve 5 is kept in its opened state, and the first fuel addition valve 7a is controlled to continue the addition of fuel.

When the first flow rate regulation valve 6a is fully opened and the second flow rate regulation valve 6b is closed by a predetermined amount or angle with the upstream side switching valve 5 being held in its opened state, the amount of the exhaust gas flowing into the first filter 30a increases, and at the same time, the amount of the exhaust gas flowing into the second filter 30b decreases.

When the amount of the exhaust gas flowing into the first filter 30a increases with the first filter 30a being raised in temperature up to the PM oxidizable temperature range, the rate of oxidation of the PM in the first filter 30a (i.e., the amount of the PM oxidized per unit time) increases. This is because the amount of oxygen flowing into the first filter 30a also increases in accordance with an increase in the amount of the exhaust gas flowing into the first filter 30a.

When the oxidation rate of the PM in the first filter 30a becomes high, it becomes possible to regenerate the PM trapping ability of the first filter 30a in a short period of time. Although it is feared that when the oxidation rate of the PM becomes high, the temperature of the catalyst in the first filter 30a might be excessively raised by the oxidation reaction heat of the PM, the amount of heat transmitted from the first filter 30a to the exhaust gas is increased due to an increase in the amount of the exhaust gas flowing into the first filter 30a, so the excessive rise in temperature of the first filter 30a can be suppressed.

Accordingly, the PM oxidation rate in the first filter 30a can be raised while suppressing the excessive rise in temperature of the first filter 30a.

On the other hand, when the second fuel addition valve 7b is made to operate with the amount of the exhaust gas flowing into the second filter 30b being decreased, the second filter 30b comes to be quickly raised in temperature by a small amount of added fuel. In addition, when the processing of raising the temperature of the first filter 30a is executed (i.e., when the amount of the exhaust gas flowing into the first filter 30a is decreased), the second filter 30b is raised in temperature to some degree with a large amount of the exhaust gas flowing into the second filter 30b, so it is possible to raise the temperature of the second filter 30b up to the PM oxidizable temperature range with an amount of added fuel less than that for the first filter 30a.

In step S305, the ECU 9 determines whether the rising in temperature of the second filter 30b has been completed, i.e., whether the temperature of the second filter 30b has risen up to the PM oxidizable temperature range. As a method for such a determination, there can be exemplified one in which when the temperature of the exhaust gas detected by the second exhaust gas temperature sensor 19b reaches the PM oxidizable temperature range, it is determined that the rising in temperature of the second filter 30b is completed.

When a negative determination is made in step S305, the ECU 9 executes the processing in step S305 in a repeated manner until the temperature of the second filter 30b reaches the PM oxidizable temperature range. When the temperature of the second filter 30b rises up to the PM oxidizable temperature range, the ECU 9 makes a positive determination in step S305 and then advances to step S306.

In step S306, the ECU 9 controls the first and second flow rate regulation valves 6a, 6b in such a manner that the first flow rate regulation valve 6a is closed by a predetermined amount or angle, and at the same time, the second flow rate regulation valve 6b is fully opened. In that case, the upstream side switching valve 5 is kept in its opened state, and the first fuel addition valve 7a and the second fuel addition valve 7b are controlled to continue the addition of fuel.

In this case, the amount of the exhaust gas flowing into the second filter 30b increases, so it becomes possible to regenerate the PM trapping ability of the second filter 30b in an efficient manner while suppressing an excessive rise in temperature of the second filter 30b.

However, when the amount of the exhaust gas flowing into the first filter 30a is decreased during the oxidation of the PM in the first filter 30a, the amount of heat transmitted from the first filter 30a to the exhaust gas decreases, so the temperature of the first filter 30a might be excessively raised.

In contrast to this, in the PM regeneration processing of this embodiment, the PM oxidation rate in the first filter 30a has been raised in a period from the time point when the first filter 30a reaches the PM oxidizable temperature range (i.e., when a positive determination is made in the above step S303) until the time point when the second filter 30b reaches the PM oxidizable temperature range (i.e., when a positive determination is made in the above step S305), so the amount of the PM remaining in the first filter 30a at the time when the processing in the above step S306 is executed becomes sufficiently small. As the amount of the PM remaining in the first filter 30a decreases, the amount of the PM oxidized per unit time decreases, too, so an excessive rise in temperature of the first filter 30a can be suppressed even if the amount of the exhaust gas flowing into the first filter 30a is decreased.

In step S307, the ECU 9 determines whether a regeneration termination condition for the first filter 30a holds. As a method for such a determination, there can be exemplified one in which the regeneration termination condition for the first filter 30a holds when the PM regeneration processing time for the first filter 30a is equal to or longer than a fixed time or when a differential pressure before and after the first filter 30a is equal to or less than a predetermined value.

When a negative determination is made in step S307, the ECU 9 executes the processing in step S307 in a repeated manner until the above-mentioned regeneration termination condition holds. When the regeneration termination condition holds, the ECU 9 make a positive determination in the above step S307, and advances to step S308. In step S308, the ECU 9 stops the operation of the first fuel addition valve 7a.

In step S309, the ECU 9 determines whether a regeneration termination condition for the second filter 30b holds. A method for such a determination is similar to that for the first filter 30a. When a negative determination is made in the above step S309, the ECU 9 executes the processing in step S309 in a repeated manner until the above-mentioned regeneration termination condition holds. When the regeneration termination condition for the second filter 30b holds, the ECU 9 makes a positive determination in the above step S309 and then advances to step S310.

In step S310, the ECU 9 stops the operation of the second fuel addition valve 7b, and at the same time controls the first flow rate regulation valve 6a, the second flow rate regulation valve 6b and the upstream side switching valve 5 (i.e., fully open the first flow rate regulation valve 6a and the second flow rate regulation valve 6b, and close the upstream side switching valve 5) so as to return the flow of the exhaust gas to an ordinary flow.

Then, when it is determined in the above step S301 that the regeneration condition for the first filter 30a does not hold, the ECU 9 advances to step S401, as shown in FIG. 7. In step S401, the ECU 9 determines whether a regeneration condition for the second filter 30b holds. When a negative determination is made in the above step S401, that is, when the regeneration conditions for the first filter 30a and the second filter 30b do not hold, the ECU 9 terminates the execution of this routine.

When a positive determination is made in step S401, the control process of the ECU 9 advances to step S402. In step S402, the ECU 9 performs the processing of raising the temperature of the second filter 30b. Specifically, the ECU 9 controls the above-mentioned valves 5, 6a, 6b in such a manner that the first flow rate regulation valve 6a is fully opened, the second flow rate regulation valve 6b is closed by a predetermined amount or angle, the upper side switching valve 5 is opened, and the second fuel addition valve 7b is operated. In this case, the amount of the exhaust gas flowing into the second filter 30b is decreased, so the second filter 30b comes to be quickly raised in temperature by a small amount of added fuel. Also, the first filter 30a comes to be raised in temperature in a suitable manner due to a large amount of the exhaust gas flowing into the first filter 30a.

In step S404, the ECU 9 controls the above-mentioned valves 6a, 6b, 7a in such a manner that the first flow rate regulation valve 6a is closed by a predetermined amount, the second flow rate regulation valve 6b is fully opened, and the first fuel addition valve 7a is operated. In that case, the upstream side switching valve 5 is kept in its opened state, and the second fuel addition valve 7b is controlled to continue the addition of fuel.

In step S404, the ECU 9 controls the above-mentioned valves 6a, 6b, 7a in such a manner that the first flow rate regulation valve 6a is fully closed, the second flow rate regulation valve 6b is fully opened, and the first fuel addition valve 7a is operated. In that case, the upstream side switching valve 5 is kept in its opened state, and the second fuel addition valve 7b is controlled to continue the addition of fuel.

In this case, the amount of the exhaust gas flowing into the second filter 30b increases, so it becomes possible to increase the PM oxidation rate of the second filter 30b while suppressing an excessive rise in temperature of the second filter 30b. In addition, since fuel is supplied from the first fuel addition valve 7a to the first filter 30a with the amount of the exhaust gas flowing into the first filter 30a being decreased, the first filter 30a comes to be quickly raised in temperature by a small amount of fuel. Here, note that the first filter 30a, being raised in temperature to some degree according to the above-mentioned processing in step S402, comes to be raised in temperature up to the PM oxidizable temperature range by a smaller amount of fuel added than the second filter 30b.

In step S405, the ECU 9 determines whether the rising in temperature of the first filter 30a is completed. When a negative determination is made in step S405, the ECU 9 executes the processing in the above step S405 in a repeated manner until the temperature of the first filter 30a reaches the PM oxidizable temperature range. When the temperature of the first filter 30a rises up to the PM oxidizable temperature range, the ECU 9 makes a positive determination in the above step S405 and then advances to step S406.

In step S406, the ECU 9 controls the first and second flow rate regulation valves 6a, 6b in such a manner that the first flow rate regulation valve 6a is fully opened, and at the same time, the second flow rate regulation valve 6b is closed by a predetermined amount or angle. In that case, the upstream side switching valve 5 is kept in its opened state, and the first fuel addition valve 7a and the second fuel addition valve 7b are controlled to continue the addition of fuel.

In this case, the amount of the exhaust gas flowing into the first filter 30a increases, so it becomes possible to regenerate the PM trapping ability of the first filter 30a in an efficient manner while suppressing an excessive rise in temperature of the first filter 30a.

In step S407, the ECU 9 determines whether the regeneration termination condition for the second filter 30b holds. When a negative determination is made in step S407, the ECU 9 executes the processing in step S407 in a repeated manner until the above-mentioned regeneration termination condition holds. When the regeneration termination condition holds, the ECU 9 make a positive determination in the above step S407, and advances to step S408. In step S408, the ECU 9 terminates the PM regeneration processing of the second filter 30b by stopping the operation of the second fuel addition valve 7b.

In step S409, the ECU 9 determines whether the regeneration termination condition for the first filter 30a holds. When a negative determination is made in the above step S409, the ECU 9 executes the processing in step S409 in a repeated manner until the above-mentioned regeneration termination condition holds. When the regeneration termination condition for the first filter 30a holds, the ECU 9 makes a positive determination in the above step S409 and then advances to step S410.

In step S410, the ECU 9 stops the operation of the first fuel addition valve 7a, and at the same time terminates the PM regeneration processing of the first filter 30a by controlling the first flow rate regulation valve 6a, the second flow rate regulation valve 6b and the upstream side switching valve 5 (i.e., fully open the first flow rate regulation valve 6a and the second flow rate regulation valve 6b, and close the upstream side switching valve 5) so as to return the flow of the exhaust gas to an ordinary flow.

According to the PM regeneration processing described above, it is possible to decrease the amount of fuel required upon regeneration of the PM trapping abilities of the first filter 30a and the second filter 30b, and at the same time to shorten the time required for the PM regeneration processing.

Here, note that in case where the first filter 30a and the second filter 30b have NOx trapping abilities, it is necessary to perform sulfur poisoning recovery processing to recover the NOx trapping abilities of the first filter 30a and the second filter 30b from sulfur poisoning, and as temperature raising processing in that case, there can be applied a method similar to the above-mentioned temperature raising processing in the PM regeneration processing.

In order to recover the NOx trapping abilities of the first filter 30a and the second filter 30b from sulfur poisoning, temperature raising processing is needed so as to raise the temperatures of the first filter 30a and the second filter 30b up to a high temperature range of about 500 degrees C. or above.

Accordingly, after the amount of the exhaust gas flowing into the first filter 30a and the second filter 30b is made to decrease, fuel is supplied from the first fuel addition valve 7a and the second fuel addition valve 7b to the first filter 30a and the second filter 30b, respectively, similar to the temperature raising processing in the above-mentioned PM regeneration processing.

Here, note that the sulfur poisoning of the NOx trapping ability is eliminated or recovered when the first filter 30a and the second filter 30b are exposed to a fuel rich atmosphere of a high temperature, so it is necessary to put the first filter 30a and the second filter 30b into a fuel rich atmosphere after the above-mentioned temperature raising processing has been executed.

As a method of putting the first filter 30a and the second filter 30b into a fuel rich atmosphere, there can be exemplified a method of supplying fuel from the first fuel addition valve 7a and the second fuel addition valve 7b to the first filter 30a and the second filter 30b, respectively, but in that case, there arises a need to add a large amount of fuel from the first fuel addition valve 7a and the second fuel addition valve 7b when the amount of the exhaust gas flowing into the first filter 30a and the second filter 30b increases.

Accordingly, in the above-mentioned PM regeneration processing, the amount of the exhaust gas flowing into the first filter 30a and the second filter 30b is increased after the processing of raising the temperatures of the first filter 30a and the second filter 30b is executed, but in sulfur poisoning recovery processing, the amount of the exhaust gas flowing into the first filter 30a and the second filter 30b may be made to continuously decrease even after the execution of the temperature raising processing of the first filter 30a and the second filter 30b.

According to such sulfur poisoning recovery processing, it becomes possible to recover the NOx trapping abilities of the first filter 30a and the second filter 30b from sulfur poisoning with the addition of a small amount of fuel.

Here, note that when the sulfur poisoning recovery processing and the PM regeneration processing are individually performed independently of each other, the amount of fuel required for the temperature raising processing increases, so it is preferable that the PM regeneration processing and the sulfur poisoning recovery processing be carried out in succession.

For example, the sulfur poisoning recovery processing may be carried out by continuing the addition of fuel from the first fuel addition valve 7a and the second fuel addition valve 7b after it is determined in steps S307 and S407 in the above-mentioned PM regeneration processing routine that the condition of termination of the PM regeneration processing holds, and by decreasing the amount of the exhaust gas flowing into the first filter 30a and the second filter 30b again and continuing the addition of fuel from the first fuel addition valve 7a and the second fuel addition valve 7b after the condition of termination of the PM regeneration processing holds in steps S309 and S409.

Although in this embodiment, the upstream side switching valve 5 is opened during the cold operation of the internal combustion engine 1, or during the execution of the PM regeneration processing, or during the execution of the sulfur poisoning recovery processing, the upstream side switching valve 5 may also be opened when the states of PM collections of the first filter 30a and the second filter 30b are different from each other. In case where the states of PM collections of the first filter 30a and the second filter 30b are different from each other, a pressure loss or drop varies according to each filter, so the back pressures acting on the respective banks also become different from each other. As a result, there is a possibility that operating conditions (i.e., the amount of EGR gas, the amount of intake air, power loss, etc.,) might become different from bank to bank when the back pressures acting on the respective banks are different from each other.

In contrast to this, when the upstream side switching valve 5 is opened with the states of PM collections of the first filter 30a and the second filter 30b being different from each other, the back pressures acting on the respective banks are leveled; whereby it becomes possible to suppress the occurrence of trouble as stated above.

Third Embodiment

Now, reference will be made to a third embodiment of the present invention based on FIGS. 8 through 10. Here, those portions of the construction of this embodiment which are different from those of the above-mentioned second embodiment will be described while omitting an explanation about similar construction portions.

Figure 8:
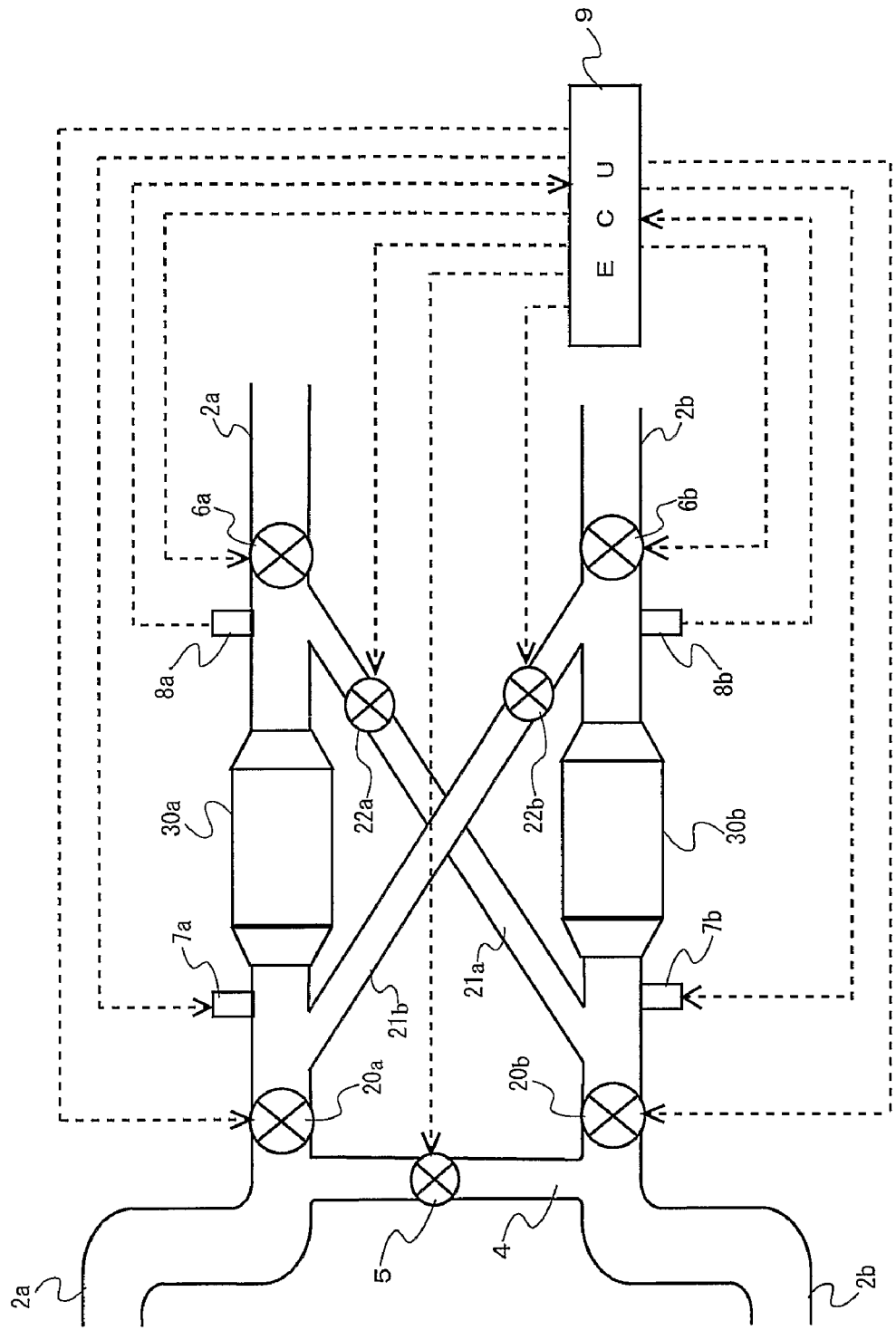
FIG. 8 is a view showing the schematic construction of an exhaust system of an internal combustion engine to which a third embodiment of the present invention is applied.

FIG. 8 is a view that shows the schematic construction of an exhaust system of an internal combustion engine to which a third embodiment of the present invention is applied. In FIG. 8, a first flow rate regulation valve 6a is arranged in a first exhaust passage 2a at a location downstream of a first filter 30a, and a second flow rate regulation valve 6b is arranged in a second exhaust passage 2b at a location downstream a second filter 30b.

A first cutoff valve 20a is arranged in the first exhaust passage 2a at a location downstream of its connecting portion with an upstream side communication passage 4 and upstream of the first filter 30a. A second cutoff valve 20b is arranged in the second exhaust passage 2b at a location downstream of its connecting portion with the upstream side communication passage 4 and upstream of the second filter 30b. A first auxiliary switching valve 22a is arranged in a first auxiliary exhaust passage 21a.

The first auxiliary exhaust passage 21a is connected with a portion of the first exhaust passage 2a downstream of the first filter 30a and upstream of the first flow rate regulation valve 6a. The first auxiliary exhaust passage 21a is connected with a portion of the second exhaust passage 2b downstream of the second cutoff valve 20b and upstream of the second filter 30b.

A second auxiliary exhaust passage 21b is connected with a portion of the second exhaust passage 2b downstream of the second filter 30b and upstream of the second flow rate regulation valve 6b. The second auxiliary exhaust passage 21b is connected with a portion of the first exhaust passage 2a downstream of the first cutoff valve 20a and upstream of the first filter 30a. A second auxiliary switching valve 22b is arranged in the second auxiliary exhaust passage 21b.

The first cutoff valve 20a, the second cutoff valve 20b, the first auxiliary switching valve 22a and the second auxiliary switching valve 22b as referred to above are electrically controlled by means of an ECU 9.

According to such an arrangement, it becomes possible to cause the entire exhaust gas emitted from the internal combustion engine 1 to flow through the first filter 30a and the second filter 30b in a serial manner. For example, when the entire exhaust gas emitted from the internal combustion engine 1 is caused to sequentially flow from the first filter 30a to the second filter 30b, the ECU 9 controls to open an upstream side switching valve 5, to fully close the first flow rate regulation valve 6a, to fully open the second flow rate regulation valve 6b, to open the first cutoff valve 20a, to close the second cutoff valve 20b, to open the first auxiliary switching valve 22a, and to close the second auxiliary switching valve 22b.

Figure 9:
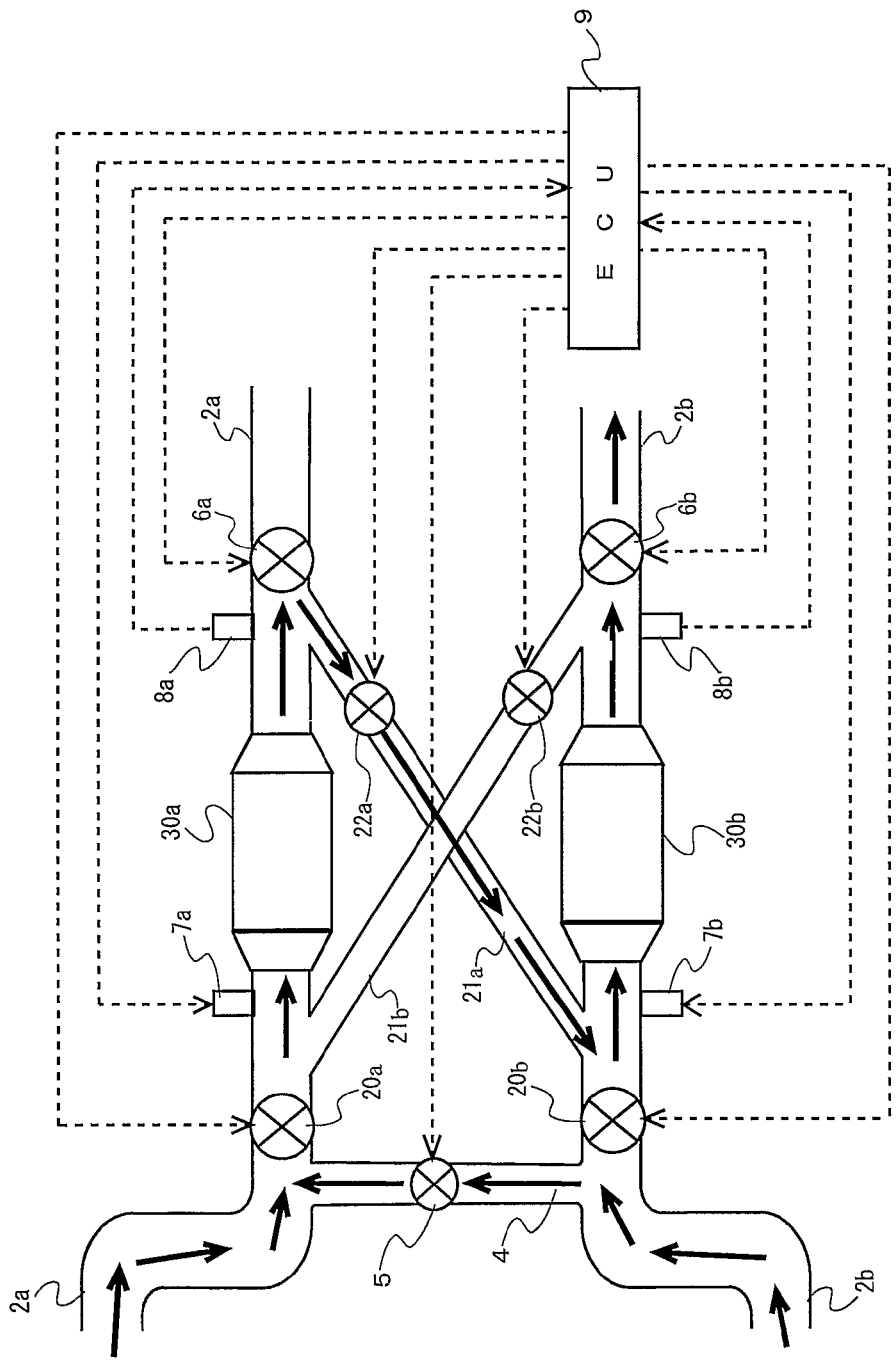
FIG. 9 is a view showing a flow path of the exhaust gas when the exhaust gas flows from the first filter to the second filter one by one in the third embodiment.

In this case, the entire exhaust gas emitted from a second bank 1b of the internal combustion engine 1 to the second exhaust passage 2b is directed to the first exhaust passage 2a through the upstream side communication passage 4, as shown in FIG. 9. The exhaust gas directed from the second exhaust passage 2b to the first exhaust passage 2a flows into the first filter 30a together with the exhaust gas emitted from a first bank 1a of the internal combustion engine 1 to the first exhaust passage 2a. The exhaust gas passing through the first filter 30a is directed to the second exhaust passage 2b through the first auxiliary exhaust passage 21a, and then flows into the second filter 30b. Accordingly, the entire exhaust gas emitted from the internal combustion engine 1 will sequentially flow from the first filter 30a to the second filter 30b.

In addition, when the entire exhaust gas emitted from the internal combustion engine 1 is caused to sequentially flow from the second filter 30b to the first filter 30a, the ECU 9 controls to open the upstream side switching valve 5, to fully open the first flow rate regulation valve 6a, to fully close the second flow rate regulation valve 6b, and to close the first cutoff valve 20a. Also, the ECU 9 controls to open the second cutoff valve 20b, to close the first auxiliary switching valve 22a, and to open the second auxiliary switching valve 22b.

Figure 10:
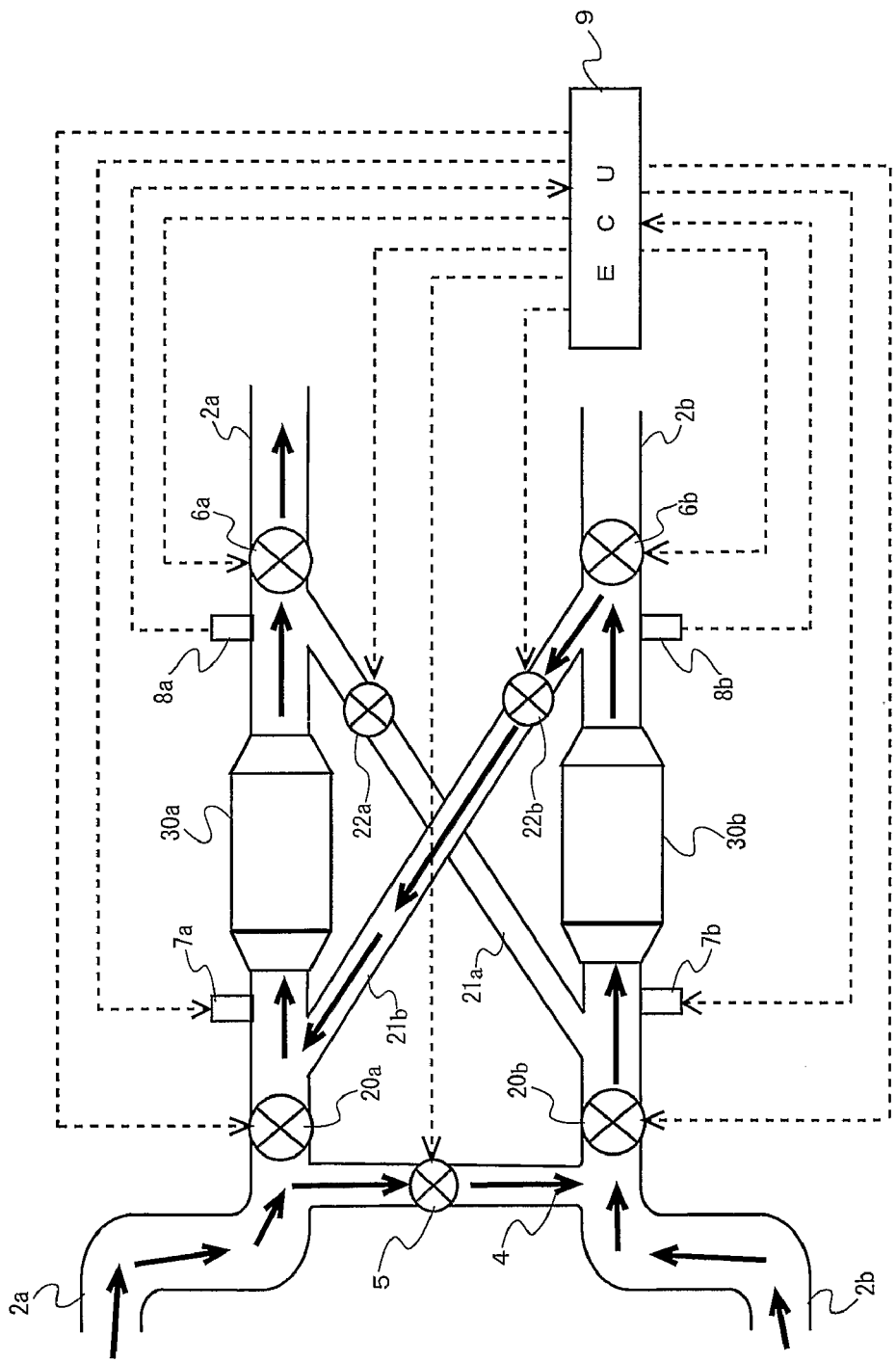
FIG. 10 is a view showing a flow path of the exhaust gas when the exhaust gas flows from the second filter to the first filter one by one in the third embodiment.

In this case, the entire exhaust gas emitted from the first bank 1a of the internal combustion engine 1 to the first exhaust passage 2a is directed to the second exhaust passage 2b through the upstream side communication passage 4, as shown in FIG. 10. The exhaust gas directed from the first exhaust passage 2a to the second exhaust passage 2b flows into the second filter 30b, together with the exhaust gas emitted from the second bank 1b to the second exhaust passage 2b. The exhaust gas passing through the second filter 30b is directed to the first exhaust passage 2a through the second auxiliary exhaust passage 21b, and then flows into the first filter 30a. Accordingly, the entire exhaust gas emitted from the internal combustion engine 1 will sequentially flow from the second filter 30b to the first filter 30a.

Here, in the engine start time exhaust gas flow control of the above-mentioned second embodiment, when the flow of the exhaust gas as stated above and shown in FIG. 9 and FIG. 10 is achieved, it becomes possible to make the activation times of the first filter 30a and the second filter 30b earlier.

Figure 5:
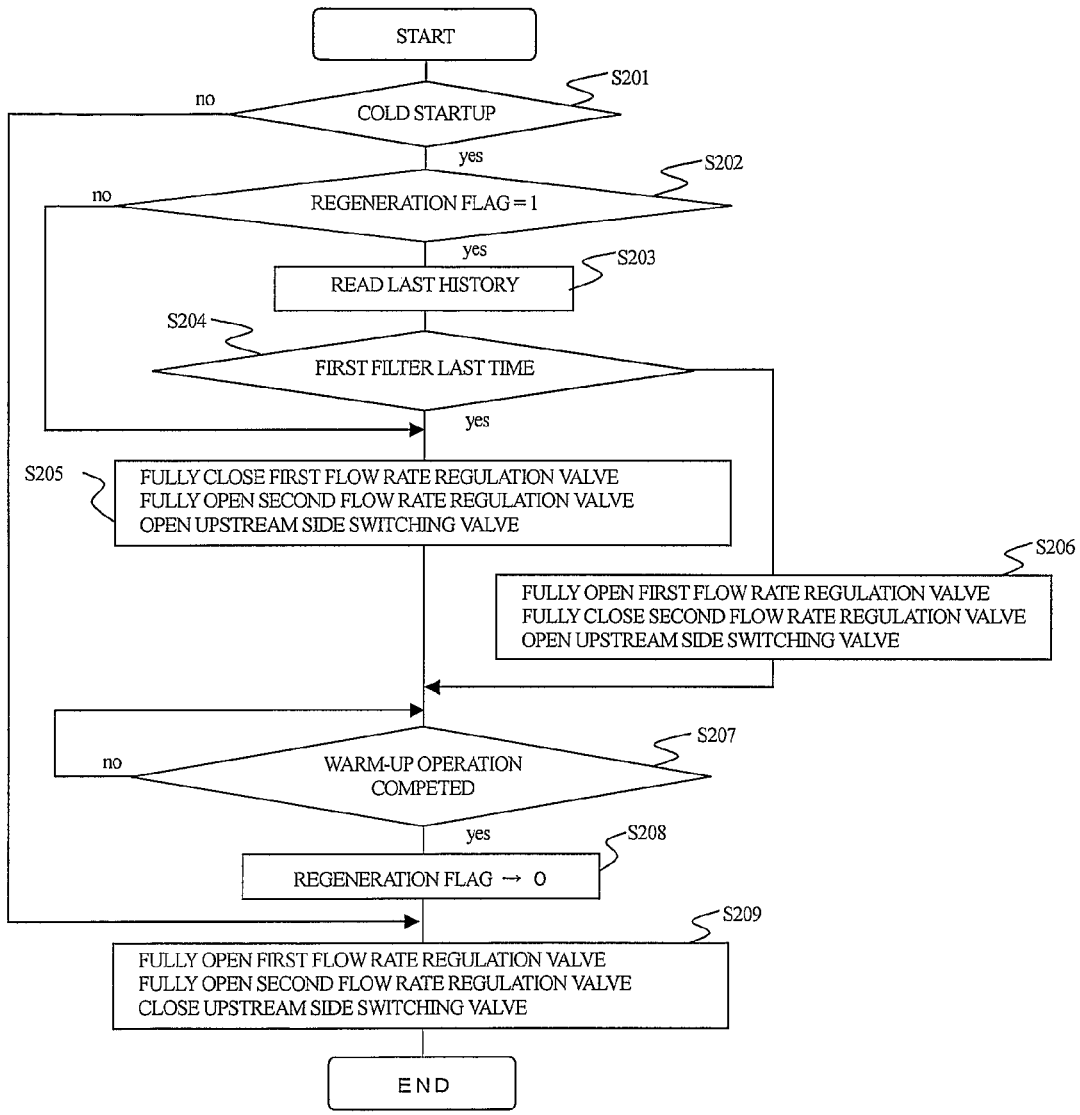
FIG. 5 is a flow chart illustrating an exhaust gas flow control routine at engine starting according to the second embodiment.

For example, when the processing in step S205 or S206 (i.e., processing that causes the entire exhaust gas emitted from the internal combustion engine 1 to flow into only one of the first filter 30a and the second filter 30b) is executed in the above-mentioned engine start time exhaust gas flow control routine in FIG. 5. The entire exhaust gas of the internal combustion engine 1 flows through only either one of the first filter 30a and the second filter 30b, so the one filter (the filter through which the exhaust gas flows) can receive the heat of the exhaust gas and be raised in temperature, but the other filter (the filter through which the exhaust gas does not flow) can not receive the heat of the exhaust gas. Accordingly, it becomes possible to cause all of the PMs emitted from the internal combustion engine 1 to be collected by only either one of the first filter 30a and the second filter 30b, but the activation time of the other filter is delayed.

In contrast to this, in the engine start time exhaust gas flow control, when the ECU 9 controls, instead of executing the processing of the above step S205, the upstream side switching valve 5, the first flow rate regulation valve 6a, the second flow rate regulation valve 6b, the first cutoff valve 20a, the second cutoff valve 20b, the first auxiliary switching valve 22a and the second auxiliary switching valve 22b so as to cause the entire exhaust gas of the internal combustion engine 1 to sequentially flow from the second filter 30b to the first filter 30a, it becomes possible not only to make all the PMs emitted from the internal combustion engine 1 be collected by the second filter 30b, but also to warm the first filter 30a with the exhaust gas.

In addition, when the ECU 9 controls, instead of executing the processing of the above step S206, the upstream side switching valve 5, the first flow rate regulation valve 6a, the second flow rate regulation valve 6b, the first cutoff valve 20a, the second cutoff valve 20b, the first auxiliary switching valve 22a and the second auxiliary switching valve 22b so as to cause the entire exhaust gas of the internal combustion engine 1 to sequentially flow from the first filter 30a to the second filter 30b, it becomes possible not only to make all the PMs emitted from the internal combustion engine 1 be collected by the first filter 30a, but also to warm the second filter 30b with the exhaust gas.

Accordingly, it becomes possible to make uniform the amounts of PM collections of both the filters 30a, 30b without excessively delaying the activation times of the first filter 30a and the second filter 30b.

Then, in the PM regeneration processing of the above-mentioned second embodiment, the amount of fuel required for PM regeneration processing can be further reduced by opening the first auxiliary switching valve 22a or the second auxiliary switching valve 22b during the temperature raising processing of the first filter 30a or the second filter 30b.

For example, in the above-mentioned PM regeneration processing routine in FIG. 6 and FIG. 7, when the first auxiliary switching valve 22a is caused to open during the execution of the processing in step S302 (the processing of raising the temperature of the first filter 30a), a part of high-temperature exhaust gas flowing out from the first filter 30a flows into the second exhaust passage 2b through the first auxiliary exhaust passage 21a, so the second filter 30b comes to be warmed by the high-temperature exhaust gas. Accordingly, the amount of added fuel required in the temperature raising processing of the second filter 30b can be further reduced.

Also, in the above-mentioned PM regeneration processing routine in FIG. 6 and FIG. 7, when the second auxiliary switching valve 22b is caused to open during the execution of the processing in step S402 (the processing of raising the temperature of the second filter 30b), a part of high-temperature exhaust gas flowing out from the second filter 30b flows into the first exhaust passage 2a through the second auxiliary exhaust passage 21b, so the first filter 30a comes to be warmed by the high-temperature exhaust gas. Accordingly, the amount of added fuel required in the temperature raising processing of the first filter 30a can be further reduced.

Fourth Embodiment

Now, reference will be made to a fourth embodiment of the present invention based on FIG. 11. Here, those portions of the construction of this embodiment which are different from those of the above-mentioned second embodiment will be described while omitting an explanation about similar construction portions.

Figure 11:
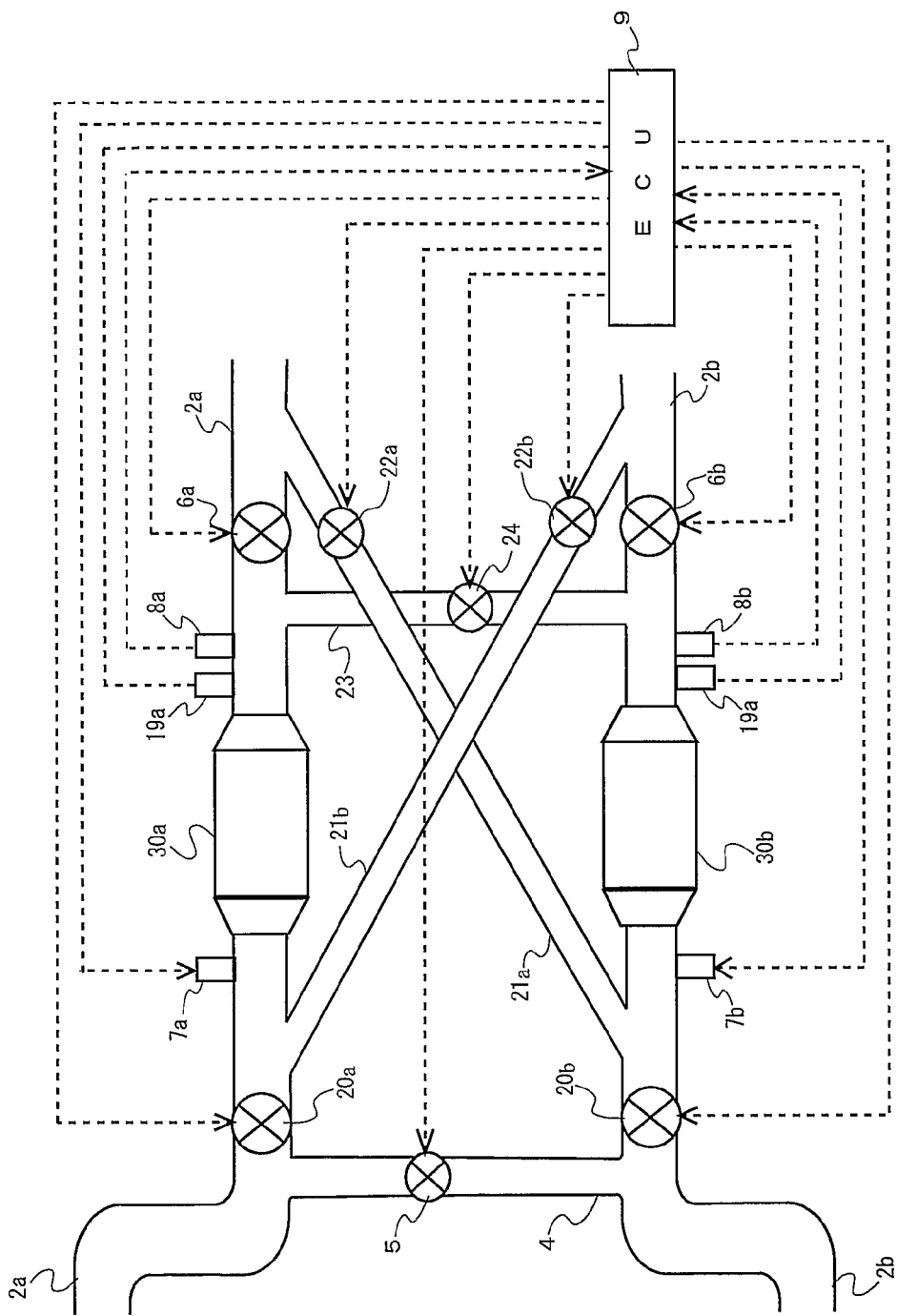
FIG. 11 is a view showing the schematic construction of an exhaust system of an internal combustion engine to which a fourth embodiment of the present invention is applied.

FIG. 11 is a view that shows the schematic construction of an exhaust system of an internal combustion engine to which the present invention is applied. In FIG. 11, a first flow rate regulation valve 6a is arranged in a first exhaust passage 2a at a location downstream of a first filter 30a and upstream of its connecting portion with a first auxiliary exhaust passage 21a. A second flow rate regulation valve 6b is arranged in a second exhaust passage 2b at a location downstream of a second filter 30b and upstream of its connecting portion with a second auxiliary exhaust passage 21b.

A portion of the first exhaust passage 2a, which is downstream of the first filter 30a and upstream of the first flow rate regulation valve 6a, and a portion of the second exhaust passage 2b, which is downstream of the second filter 30b and upstream of the second flow rate regulation valve 6b, are placed in communication with each other through a downstream side communication passage 23. A downstream side switching valve 24 is arranged in the downstream side communication passage 23.

According to such an arrangement, it becomes possible to cause the exhaust gas to flow through the first filter 30a or the second filter 30b in a reverse direction. For example, the ECU 9 operates to open an upstream side switching valve 5, to fully close the first flow rate regulation valve 6a and the second flow rate regulation valve 6b, to open the first cutoff valve 20a, to close the second cutoff valve 20b, to open the first auxiliary switching valve 22a, to close the second auxiliary switching valve 22b, and to open the downstream side switching valve 24.

Figure 12:
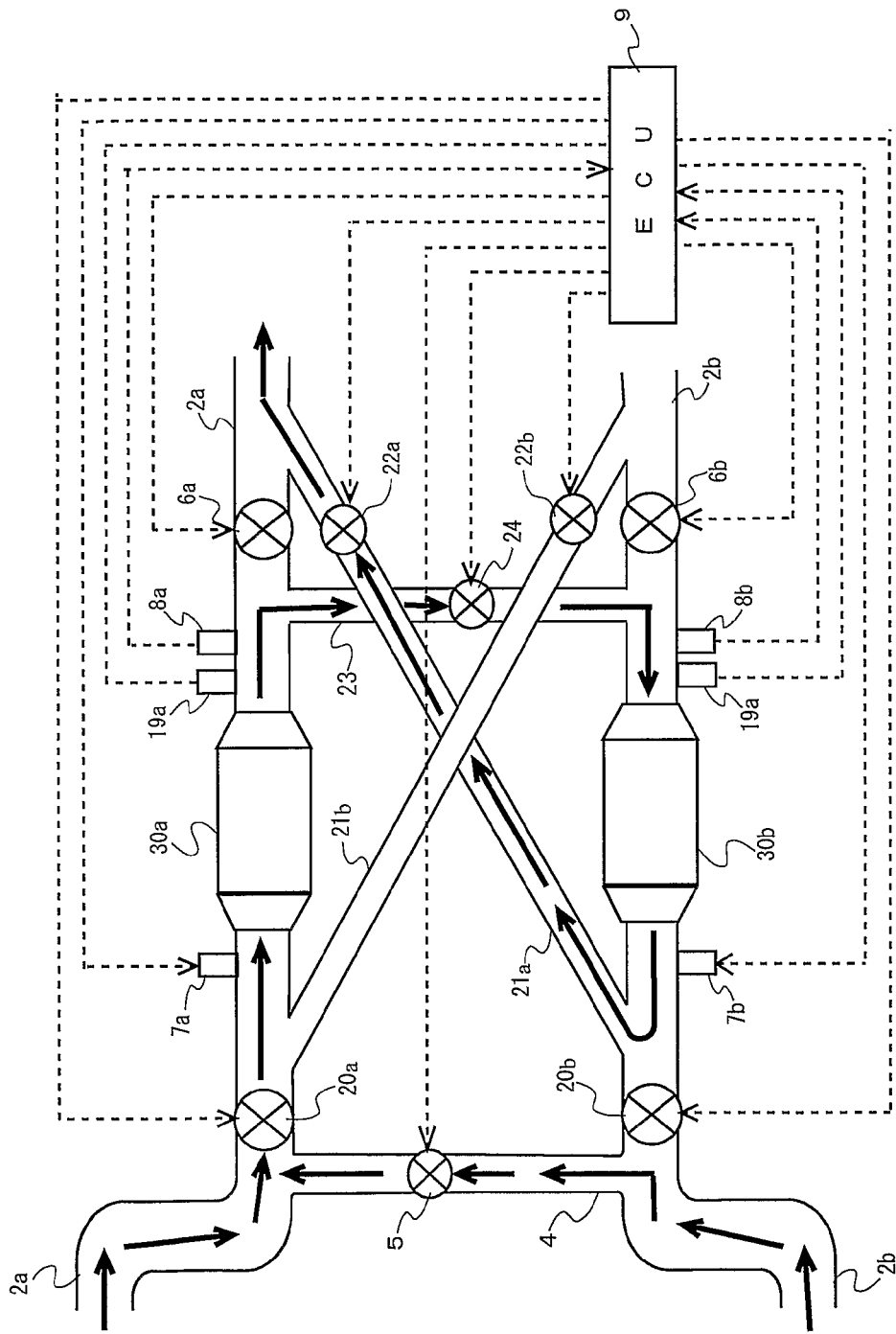
FIG. 12 is a view showing a flow path of the exhaust gas when the entire exhaust gas flows backward in the second filter in a fourth embodiment of the present invention.

In this case, the entire exhaust gas emitted from a second bank 1b of the internal combustion engine 1 to the second exhaust passage 2b is directed to the first exhaust passage 2a through the upstream side communication passage 4, as shown in FIG. 12. The exhaust gas directed from the second exhaust passage 2b to the first exhaust passage 2a flows into the first filter 30a together with the exhaust gas emitted from a first bank 1a of the internal combustion engine 1 to the first exhaust passage 2a. The exhaust gas passing through the first filter 30a is directed to a portion of the second exhaust passage 2b downstream of the second filter 30b through the downstream side communication passage 23. In that case, since the second flow rate regulation valve 6b is fully closed, the exhaust gas directed to the second exhaust passage 2b flows back through the second exhaust passage 2b and the second filter 30b to come into a portion of the second exhaust passage 2b upstream of the second filter 30b. The exhaust gas directed to the portion of the second exhaust passage 2b upstream of the second filter 30b flows a portion of the first exhaust passage 2a downstream of the first flow rate regulation valve 6a through the first auxiliary exhaust passage 21a.

Accordingly, the entire exhaust gas emitted from the internal combustion engine 1 will flow back in the second filter 30b from its downstream side to its upstream side after passing through the first filter 30a from its upstream side to its downstream side.

Here, note that when the flow of the exhaust gas as stated above is achieved during the execution of the PM regeneration processing of the second filter 30b, the effect of the PM regeneration processing on the second filter 30b can be enhanced. That is, when the exhaust gas flows through the second filter 30b from its upstream side to its downstream side during the execution of the PM regeneration processing, there is a possibility of the PM collected on an upstream side end face of the second filter 30b remaining unoxidized, but when the exhaust gas flows back in the second filter 30b from its downstream side to its upstream side during the execution of the PM regeneration processing, the PM collected on the upstream side end face of the second filter 30b can be easily oxidized.

Accordingly, when the flow of the exhaust gas as stated above is achieved during the execution of the PM regeneration processing of the second filter 30b, it becomes possible to suppress a part of the PM from remaining unoxidized on the upstream side end face, etc., of the second filter 30b.

In addition, the ECU 9 may operate to open an upstream side switching valve 5, to fully close the first flow rate regulation valve 6a and the second flow rate regulation valve 6b, to close the first cutoff valve 20a, to open the second cutoff valve 20b, to close the first auxiliary switching valve 22a, to open the second auxiliary switching valve 22b, and to open the downstream side switching valve 24.

Figure 13:
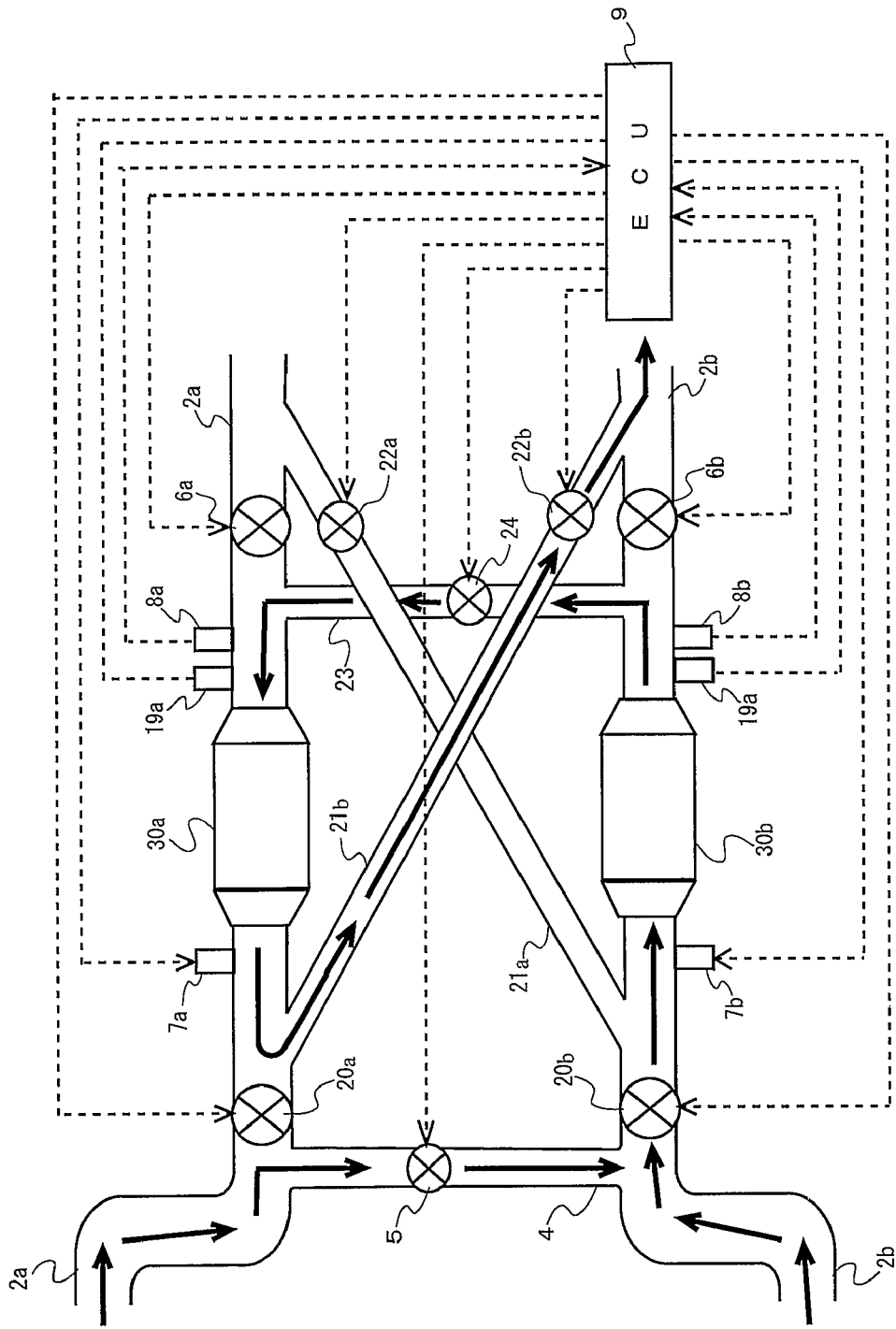
FIG. 13 is a view showing a flow path of the exhaust gas when the entire exhaust gas flows backward in the first filter in a fourth embodiment of the present invention.

In this case, the entire exhaust gas emitted from the first bank 1a of the internal combustion engine 1 to the first exhaust passage 2a is directed to the second exhaust passage 2b through the upstream side communication passage 4, as shown in FIG. 13. The exhaust gas directed from the first exhaust passage 2a to the second exhaust passage 2b flows into the second filter 30b, together with the exhaust gas emitted from the second bank 1b to the second exhaust passage 2b. The exhaust gas passing through the second filter 30b is directed to a portion of the first exhaust passage 2a downstream of the first filter 30a through the downstream side communication passage 23. In that case, since the first flow rate regulation valve 6a is fully closed, the exhaust gas directed to the first exhaust passage 2a flows back in the first exhaust passage 2a and the first filter 30a to come into a portion of the first exhaust passage 2a upstream of the first filter 30a. The exhaust gas directed to the portion of the first exhaust passage 2a upstream of the first filter 30a flows into a portion of the second exhaust passage 2b downstream of the second flow rate regulation valve 6b through the second auxiliary exhaust passage 21b.

Accordingly, the entire exhaust gas emitted from the internal combustion engine 1 will flow back in the first filter 30a from its downstream side to its upstream side after passing through the second filter 30b from its upstream side to its downstream side.

Here, when the flow of the exhaust gas as stated above is achieved during the execution of the PM regeneration processing of the first filter 30a, it becomes possible to suppress a part of the PM from remaining unoxidized on the upstream side end face, etc., of the first filter 30a.

The invention claimed is:

1. An exhaust gas purification apparatus for an internal combustion engine including a plurality of independent exhaust passages provided one for each cylinder group, and a plurality of catalysts each having a NOx trapping ability and/or a PM trapping ability and being arranged in said exhaust passages, respectively, characterized by comprising:
    an upstream side communication passage connecting mutually portions of said exhaust passages at upstream of said catalysts;
    an upstream side switching valve opening and closing said upstream side communication passage;
    reducing agent addition valves being arranged in said exhaust passages between their connecting portions with said upstream side communication passage and said catalysts, respectively;
    a plurality of flow rate regulation valves being arranged at downstream of connecting portions of said exhaust passages with said upstream side communication passage, respectively; and
    a control section controlling said upstream side switching valve and said respective flow rate regulation valves in accordance with the states of said respective catalysts,
    wherein when the NOx trapping ability of one of said plurality of catalysts is regenerated, said control section opens said upstream side switching valve, decreases the degree of opening of one flow rate regulation valve in one of said exhaust passages in which said one catalyst is arranged, and supplies a reducing agent to said one catalyst from one reducing agent addition valve in said one exhaust passage in which said one catalyst is arranged.

2. The exhaust gas purification apparatus for an internal combustion engine according to claim 1, wherein
    said control section fully closes said one flow rate regulation valve after or simultaneously with opening of said upstream side switching valve, and operate said one reducing agent addition valve at timing at which said reducing agent arrives at said one catalyst when the actual degree of opening of said one flow rate regulation valve becomes fully closed.

3. The exhaust gas purification apparatus for an internal combustion engine according to claim 2, wherein
    said control section controls said one reducing agent addition valve so as to add said reducing agent therefrom within a period from a time point at which a fully closing command signal is output to said one flow rate regulation valve to a time point at which the actual degree of opening of said one flow rate regulation valve becomes fully closed.

4. The exhaust gas purification apparatus for an internal combustion engine according to claim 1, wherein
    each of said plurality of catalysts has a PM trapping ability;
    said control section controls said upstream side switching valve and said respective flow rate regulation valves in such a manner that an entire exhaust gas flows into a specific one of said plurality of catalysts in a predetermined period from startup of said internal combustion engine, with said specific catalyst being changed from one to another at each startup of said internal combustion engine.

5. The exhaust gas purification apparatus for an internal combustion engine according to claim 1, wherein
    when the PM trapping ability of a specific one of said plurality of catalysts is regenerated, said control section opens said upstream side switching valve, decreases the degree of opening of one of said flow rate regulation valves which is arranged in the same exhaust passage as that in which said specific catalyst is arranged, and supplies a reducing agent to said specific catalyst from one of said reducing agent addition valves which is arranged in the same exhaust passage as that in which said specific catalyst is arranged;
    after said specific catalyst rises in temperature up to a desired target temperature range, said control section increases the degree of opening of said one flow rate regulation valve which is arranged in the same exhaust passage as that in which said specific catalyst is arranged, and at the same time decreases the degree of opening of each of the other flow rate regulation valves which are arranged in the same exhaust passages as those in which the other catalysts are arranged, and further supplies a reducing agent to said other catalysts from the other reducing agent addition valves which are arranged in the same exhaust passages as those in which said other catalysts are arranged.

6. The exhaust gas purification apparatus for an internal combustion engine according to claim 1, wherein
    when a specific one of said plurality of catalysts is recovered from sulfur poisoning, said control section opens said upstream side switching valve, decreases the degree of opening of one of said flow rate regulation valves which is arranged in the same exhaust passage as that in which said specific catalyst is arranged, and supplies a reducing agent to said specific catalyst from one of said reducing agent addition valves which is arranged in the same exhaust passage as that in which said specific catalyst is arranged;
    after said specific catalyst is recovered from sulfur poisoning, said control section increases the degree of opening of said one flow rate regulation valve which is arranged in the same exhaust passage as that in which said specific catalyst is arranged, and at the same time decreases the degree of opening of each of the other flow rate regulation valves which are arranged in the same exhaust passages as those in which the other catalysts are arranged, and further supplies a reducing agent to said other catalysts from the other reducing agent addition valves which are arranged in the same exhaust passages as those in which said other catalysts are arranged.

7. The exhaust gas purification apparatus for an internal combustion engine according to claim 1, wherein by further comprising:
auxiliary exhaust passages connecting portions of said exhaust passages at downstream of said catalysts with portion of another exhaust passage between another catalyst and its connecting portion with said upstream side communication passage, respectively;
auxiliary switching valves opening and closing said auxiliary exhaust passages, respectively; and
cutoff valves being arranged between connecting portions of said exhaust passages with said auxiliary exhaust passages at upstream of said catalysts and connecting portions of said exhaust passages with said upstream side communication passage, respectively;
wherein each of said flow rate regulation valves is arranged downstream of a connecting portion of each of said exhaust passages with each of said auxiliary exhaust passages at the downstream of each of said catalysts.

8. The exhaust gas purification apparatus for an internal combustion engine according to claim 1, wherein by further comprising:
auxiliary exhaust passages connecting portions of said exhaust passages at downstream of said catalysts with a portion of another exhaust passage between another catalyst arranged therein and its connecting portion with said upstream side communication passage, respectively;
auxiliary switching valves opening and closing said auxiliary exhaust passages, respectively; and,
cutoff valves being arranged between connecting portions of said exhaust passages with said auxiliary exhaust passages at upstream of said catalysts and connecting portions of said exhaust passages with said upstream side communication passage, respectively,
a downstream side communication passage connecting mutually portions of said respective exhaust passages between their connecting portions with said auxiliary exhaust passages and said respective catalysts; and
a downstream side switching valve opening and closing said downstream side communication passage;
wherein said flow rate regulation valves are arranged in said exhaust passages between their connecting portions with said downstream side communication passage and their connecting portions with said auxiliary exhaust passages at the downstream of said catalysts, respectively.

9. An exhaust gas purification method for an internal combustion engine including a plurality of independent exhaust passages provided one for each cylinder group, and a plurality of catalysts each having a NOx trapping ability and being arranged in said exhaust passages, respectively, characterized by comprising:
communicating, upon regeneration of the NOx trapping ability of one of said plurality of catalysts, a portion of one exhaust passage at upstream of said one catalyst arranged therein with another exhaust passage at upstream of another catalyst arranged therein;
fully closing a flow rate regulation valve that regulates the flow rate of an exhaust gas flowing into said one catalyst; and
adding a reducing agent to said one exhaust passage at upstream of said one catalyst before the actual degree of opening of said flow rate regulation valve becomes fully closed,
wherein when the NOx trapping ability of one of said plurality of catalysts is regenerated, a control section opens said upstream side switching valve, decreases the degree of opening of one flow rate regulation valve in one of said exhaust passages in which said one catalyst is arranged, and supplies a reducing agent to said one catalyst from one reducing agent addition valve in said one exhaust passage in which said one catalyst is arranged.

* * * * *